(12) United States Patent
Cronin et al.

(10) Patent No.: US 12,157,089 B2
(45) Date of Patent: Dec. 3, 2024

(54) SYSTEMS AND METHODS FOR PLASMA-BASED REMEDIATION OF $SO_x$ and $NO_x$

(71) Applicants: University of Southern California, Los Angeles, CA (US); Tai Chong Cheang Steamship Co. (H.K.) Limited, Hong Kong (CN)

(72) Inventors: Stephen B. Cronin, Los Angeles, CA (US); Alec Nystrom, Los Angeles, CA (US); Sriram Subramanian, Los Angeles, CA (US); Vyaas Gururajan, Los Angeles, CA (US); Haotian Shi, Los Angeles, CA (US); Martin A. Gundersen, Los Angeles, CA (US); William Schroeder, Los Angeles, CA (US); Sisi Yang, Los Angeles, CA (US); Christi Schroeder, Los Angeles, CA (US); Fokion Egolfopoulos, Los Angeles, CA (US); Tom Huiskamp, Los Angeles, CA (US)

(73) Assignees: University of Southern California, Los Angeles, CA (US); Tai Chong Cheang Steamship Co. (H.K.) Limited, Hong Kong (CN)

( * ) Notice: Subject to any disclaimer, the term of this patent is extended or adjusted under 35 U.S.C. 154(b) by 464 days.

(21) Appl. No.: 17/437,772

(22) PCT Filed: Mar. 11, 2020

(86) PCT No.: PCT/US2020/022189
§ 371 (c)(1),
(2) Date: Sep. 9, 2021

(87) PCT Pub. No.: WO2020/185966
PCT Pub. Date: Sep. 17, 2020

(65) Prior Publication Data
US 2022/0152553 A1    May 19, 2022

Related U.S. Application Data

(60) Provisional application No. 62/944,970, filed on Dec. 6, 2019, provisional application No. 62/816,694, filed
(Continued)

(51) Int. Cl.
*B01D 53/32* (2006.01)
*B01D 53/50* (2006.01)
(Continued)

(52) U.S. Cl.
CPC .......... *B01D 53/32* (2013.01); *B01D 53/507* (2013.01); *B01D 53/56* (2013.01); *B01D 53/60* (2013.01);
(Continued)

(58) Field of Classification Search
None
See application file for complete search history.

(56) References Cited

U.S. PATENT DOCUMENTS 1,357,201 A  10/1920  Nesbit et al.
3,157,479 A  11/1964  Boles et al.
(Continued)

FOREIGN PATENT DOCUMENTS

CN  200984492 Y  12/2007
CN  101496987 A  8/2009
(Continued)

OTHER PUBLICATIONS

CN108722141A_ENG (Espacenet machine translation of Shi) (Year: 2018).*
(Continued)

*Primary Examiner* — Gabriel E Gitman
(74) *Attorney, Agent, or Firm* — Fulwider Patton LLP; Michael J. Moffatt, Esq.

(57) ABSTRACT

This invention relates to methods and systems for reducing the concentration of SOx and/or NOx in gas streams.

4 Claims, 27 Drawing Sheets

Related U.S. Application Data on Mar. 11, 2019, provisional application No. 62/816,589, filed on Mar. 11, 2019.

(51) Int. Cl.
  *B01D 53/56* (2006.01)
  *B01D 53/60* (2006.01)
(52) U.S. Cl.
  CPC .. *B01D 2252/103* (2013.01); *B01D 2257/302* (2013.01); *B01D 2257/404* (2013.01); *B01D 2258/01* (2013.01); *B01D 2259/818* (2013.01); *H05H 2240/20* (2013.01)

(56) References Cited

U.S. PATENT DOCUMENTS

| | | | |
|---|---|---|---|
| 3,423,664 | A | 1/1969 | Dewey |
| 3,875,922 | A | 4/1975 | Kirmss |
| 5,725,822 | A | 3/1998 | Keller et al. |
| 6,224,837 | B1 | 5/2001 | Okamoto et al. |
| 9,067,788 | B1 * | 6/2015 | Spielman ............ C01B 13/10 |
| 2004/0000475 | A1 | 1/2004 | Cho et al. |
| 2004/0200811 | A1 | 10/2004 | Linjewile et al. |
| 2005/0126159 | A1 | 6/2005 | Cho et al. |
| 2007/0261556 | A1 | 11/2007 | Kasai et al. |
| 2007/0266702 | A1 | 11/2007 | Cotton |
| 2018/0215639 | A1 | 8/2018 | Locke et al. |
| 2022/0184551 | A1 | 6/2022 | Cronin et al. |

FOREIGN PATENT DOCUMENTS

| | | | | |
|---|---|---|---|---|
| CN | 106039945 | A | | 10/2016 |
| CN | 106422704 | A * | 2/2017 | ............ B01D 50/00 |
| CN | 107433132 | A | | 12/2017 |
| CN | 108722141 | A * | 11/2018 | ............ B01D 53/32 |
| CN | 113785119 | A | | 12/2021 |
| CN | 114173907 | A | | 3/2022 |
| EP | 1173385 | | | 11/2000 |
| EP | 1541821 | A1 | | 6/2005 |
| EP | 3130773 | A1 | | 2/2017 |
| EP | 3938081 | A1 | | 1/2022 |
| EP | 3938644 | A2 | | 1/2022 |
| JP | H08100631 | A * | 4/1996 | |
| JP | H10325 | A | | 1/1998 |
| JP | 2006138227 | A | | 6/2006 |
| JP | 2013-050071 | A | | 3/2013 |
| JP | 2022-524631 | A | | 5/2022 |
| JP | 2022-525132 | A | | 5/2022 |
| KR | 20100081600 | A | | 7/2010 |
| KR | 20210134761 | A | | 11/2021 |
| KR | 20210136091 | A | | 11/2021 |
| SG | 11202109812Q | A | | 10/2021 |
| SG | 11202109996 | R | | 10/2021 |
| WO | 2010/011408 | A1 | | 1/2010 |
| WO | 2020/185951 | A2 | | 9/2020 |
| WO | 2020/185966 | A1 | | 9/2020 |

OTHER PUBLICATIONS

JPH08100631A_ENG (Espacenet machine translation of Sakakibara) (Year: 1996).*
CN106422704A_ENG (Espacenet machine translation of Gao) (Year: 2017).*
International Preliminary Report on Patentability for PCT/US2020/022172 dated Sep. 23, 2021, 9 pages.
EP 20769320.1 Partial European Search Report dated Dec. 2, 2022, 26 pages.
EP 20769320.1 Extended European Search Report dated Mar. 6, 2023, 12 pages.
SG 11202109812Q A Search Report and Written Opinion dated Jan. 4, 2023, 10 pages.
International Preliminary Report on Patentability for PCT/US2020/022189 dated Sep. 23, 2021, 9 pages.
EP 20769477.9 Extended European Search Report dated Dec. 23, 2022, 16 pages.
Abolmasov et al., Negative corona in silane-argon-hydrogen mixtures at low pressures, J. Phys. D: Appl. Phys. 41 (2008) 165203, pp. 1-6.
Stancampiano et al., Plasma and Aerosols: Challenges, Opportunities and Perspectives, Appl. Sci. 2019, 9, 3861, pp. 1-10.
Yan et al., A High-Voltage Pulse Generator for Corona Plasma Generation, IEEE Transactions on Industry Applications, 38(3), 2002, pp. 866-872.
Yamamoto et al., Performance Evaluation of Nonthermal Plasma Reactors for NO Oxidation in Diesel Engine Exhaust Gas Treatment, IEEE Transactions on Industry Applications, 39, 2003, pp. 1608-1613.
Wang et al., Solid-State High Voltage Nanosecond Pulse Generator, IEEE, Pulsed Power Conference, 2005, pp. 1199-1202.
Poulain et al., The plasma levitation of droplets, Appl. Phys. Lett. 107, 064101, 2015, pp. 1-4.
Written Opinion for SG11202109996R dated Jan. 4, 2023, 5 pages.
International Search Report and Written Opinion for PCT/US2020/022172 dated Sep. 1, 2020, 13 pages.
International Search Report and Written Opinion for PCT/US2020/022189 dated Jun. 19, 2020, 11 pages.
Fujii et al., Removal of Nox by DC Corona Reactor with Water, Journal of Electrostatics, 2001, vol. 51, pp. 8-14.
Kuroki et al., Single-Stage Plasma-Chemical Process for Particulates, NO/sub x/, and SO/sub x/ Simulataneous Removal, IEEE Transactions on Industry Applications, 2002, vol. 38(5), pp. 1204-1209.
Mohapatro et al., Abatement of NOx using Compact High Voltage Pulse Power Supply: Towards Retrofitting to Automobile Vehicle, IEEE Transactions on Dielectrics and Electrical Insulation, 2017, vol. 24(5), pp. 2738-2745.
Sakugawa et al., Investigation of Preionization Effects in Atmospheric Pulsed Discharge, IEEE Transactions on Plasma Science, 2014, vol. 42(11), pp. 3633-3638.
Schroeder et al., Plasma-Enhanced SO2 Remediation in Humidified Gas Matrix: A Potential Strategy for the Continued Burning of High-Sulfur Bunker Fuel, Fuel 274, 2020, pp. 1-4.

* cited by examiner

SYSTEMS AND METHODS FOR PLASMA-BASED REMEDIATION OF $SO_x$ and $NO_x$

CROSS-REFERENCE TO RELATED APPLICATION

This application is a National Phase of International Application No. PCT/US2020/022189, filed Mar. 11, 2020, which designated the U.S. and that International Application was published under PCT Article 21 (2) in English. Both applications include a claim of priority under 35 U.S.C. § 119 (e) to U.S. Provisional Patent Application No. 62/816,589 filed Mar. 11, 2019, U.S. Provisional Patent Application No. 62/816,694 filed Mar. 11, 2019, and U.S. Provisional Patent Application No. 62/944,970 filed Dec. 6, 2019, the contents of each of which are incorporated herein by reference in their entirety.

FIELD OF THE INVENTION

This invention relates to methods and systems for reducing the concentration of SOx and/or NOx in a gas stream.

BACKGROUND

All publications herein are incorporated by reference to the same extent as if each individual publication or patent application was specifically and individually indicated to be incorporated by reference. The following description includes information that may be useful in understanding the present invention. It is not an admission that any of the information provided herein is prior art or relevant to the presently claimed invention, or that any publication specifically or implicitly referenced is prior art.

The international Marine Organization (IMO) has set a global limit for sulfur in fuel oil used on board ships of 0.50% m/m (mass by mass) from 1 Jan. 2020. This will significantly reduce the amount of sulfur oxides emanating from ships and should have major health and environmental benefits for the world, particularly for populations living close to ports and coasts. The current global limit for sulfur content of ships' fuel oil is 3.50% (i.e., heavy fuel oil). The new 2020 global limit of 0.50% corresponds to a 7-fold reduction in SOx, which can be achieved with our plasma-enhanced wet scrubber device. Without some form of sulfur remediation technology, these IMO standards will have a catastrophic impact on the petroleum industry by upsetting the supply-demand equilibrium.

Therefore, there is a need for methods and apparatus for SOx and/or NOx remediation. The embodiments of the present invention address that need.

SUMMARY OF THE INVENTION

The following embodiments and aspects thereof are described and illustrated in conjunction with systems, apparatus, articles of manufacture, compositions, and methods which are meant to be exemplary and illustrative, not limiting in scope.

In various embodiments, the present invention provides a system for plasma-based remediation, comprising: a flow reactor, wherein the flow reactor comprises an internal chamber and an electrode at least partially disposed within the internal chamber, the internal chamber being configured to be fluidly coupled to a gas source such that a gas from the gas source flows into the internal chamber of the flow reactor, wherein the gas comprises a concentration of a first chemical compound, wherein the first chemical compound is selected from the group consisting of NOx, SOx, and combinations thereof, a pulse generator electrically coupled to the electrode of the flow reactor, the pulse generator being configured to deliver electrical pulses to the electrode to thereby form a plasma from the gas, the first chemical compound being converted to a second chemical compound in the plasma; and a water source fluidly coupled to the internal chamber of the flow reactor, the water source being configured to inject water into the internal chamber of the flow reactor to form ˙OH (hydroxyl radical) molecules from at least a first portion of the injected water when the electrical pulses are delivered to the electrode, the ˙OH molecules reacting with the second chemical compound in the plasma so as to convert the second chemical compound into a water soluble chemical compound, and at least a second portion of the injected water removing the water soluble chemical compound from the flow reactor, thereby reducing the concentration of the first chemical compound in the gas. In some embodiments, the electrode is selected from the group consisting of a three-wire electrode, a four-wire electrode, and an extruded electrode. In some embodiments, the extruded electrode includes a central portion and at least one arm extending from the central portion. In some embodiments, the plasma is a non-thermal plasma. In some embodiments, NOx is NO. In some embodiments, the second chemical compound is $NO_2$. In some embodiments, the water soluble chemical compound is $HNO_3$. In some embodiments, SOx is $SO_2$. In some embodiments, the second chemical compound is $HSO_3$. In some embodiments, the water soluble chemical compound is $H_2SO_4$. In some embodiments, the pulse generator is a solid-state nanosecond high voltage pulse generator. In some embodiments, the gas is an exhaust gas. In some embodiments, the gas source is an engine. In some embodiments, the engine is a combustion engine. In some embodiments, the engine is a diesel engine. In some embodiments, the electrical pulses are high voltage nanosecond electrical pulses. In some embodiments, the electrical pulses have a repetition rate of up to 2000 Hz. In some embodiments, the water is water aerosol. In some embodiments, the water is water vapor. In some embodiments, at least a portion of the flow reactor can be heated, cooled, or both.

In various embodiments, the present invention provides a method for plasma-based remediation, comprising: receiving a gas from a gas source into an internal chamber of a flow reactor, wherein the gas comprises a concentration of a first chemical compound, wherein the first chemical compound is selected from the group consisting of NOx, SOx, and combinations thereof; delivering electric pulses to an electrode positioned in the internal chamber such that a plasma is formed from the gas, wherein the first chemical compound is converted to a second chemical compound in the plasma; injecting water into the internal chamber of the flow reactor in the presence of the plasma, wherein ˙OH (hydroxyl radical) molecules are formed from at least a first portion of the injected water when the electrical pulses are delivered to the electrode, and wherein the ˙OH molecules react with the second chemical compound so as to convert the second chemical compound into a water soluble chemical compound; and removing at least a second portion of the injected water from the flow reactor, wherein the second portion of the injected water comprises the water soluble compound, thereby reducing the concentration of the first chemical compound in the gas. In some embodiments, the electrode is selected from the group consisting of a three-wire electrode, a four-wire electrode, and an extruded electrode. In some embodiments, the extruded electrode includes a central portion and at least one arm extending from the central portion. In some embodiments, the plasma is a non-thermal plasma. In some embodiments, NOx is NO. In some embodiments, the second chemical compound is $NO_2$. In some embodiments, the water soluble chemical compound is $HNO_3$. In some embodiments, SOx is $SO_2$. In some embodiments, the second chemical compound is $HSO_3$. In some embodiments, the water soluble chemical compound is $H_2SO_4$. In some embodiments, the electric pulses are delivered by a pulse generator. In some embodiments, the pulse generator is a solid-state nanosecond high voltage pulse generator. In some embodiments, the gas is an exhaust gas. In some embodiments, the gas source is an engine. In some embodiments, the engine is a combustion engine. In some embodiments, the engine is a diesel engine. In some embodiments, the electrical pulses are high voltage nanosecond electrical pulses. In some embodiments, the electrical pulses have a repetition rate of up to 2000 Hz. In some embodiments, the water is water aerosol. In some embodiments, the water is water vapor. In some embodiments, at least a portion of the flow reactor can be heated, cooled, or both.

In various embodiments, the present invention provides a plasma reactor for plasma-based remediation, comprising: a flow reactor comprising an internal chamber; a gas input port coupled to the flow reactor, the gas input port being configured to fluidly couple a gas source to the flow reactor such that a gas can flow into the internal chamber of the flow reactor; an electrode at least partially disposed within the internal chamber of the flow reactor; a pulse generator electrically coupled to the electrode, the pulse generator being configured to deliver electrical pulses to the electrode to thereby form a plasma from the gas; a water inlet port coupled to the flow reactor, the water inlet port being configured to fluidly couple a water source to the internal chamber of the flow reactor, the water source being configured to inject water into the internal chamber of the flow reactor in the presence of the plasma; a gas outlet port coupled to the flow reactor, the gas outlet port being configured to remove the gas from the internal chamber of the flow reactor; and a water output port coupled to the flow reactor, the water output port being configured to remove the water from the internal chamber of the flow reactor. In some embodiments, the electrode is selected from the group consisting of a three-wire electrode, a four-wire electrode, and an extruded electrode. In some embodiments, the extruded electrode includes a central portion and at least one arm extending from the central portion. In some embodiments, the plasma is a non-thermal plasma. In some embodiments, the pulse generator is a solid-state nanosecond high voltage pulse generator. In some embodiments, the gas is an exhaust gas. In some embodiments, the gas source is an engine. In some embodiments, the engine is a combustion engine. In some embodiments, the engine is a diesel engine. In some embodiments, the electrical pulses are high voltage nanosecond electrical pulses. In some embodiments, the electrical pulses have a repetition rate of up to 2000 Hz. In some embodiments, the water is water aerosol. In some embodiments, the water is water vapor. In some embodiments, at least a portion of the flow reactor can be heated, cooled, or both.

Exemplary embodiments are illustrated in referenced figures. It is intended that the embodiments and figures disclosed herein are to be considered illustrative rather than restrictive.

DETAILED DESCRIPTION OF THE INVENTION

Figure 1A:
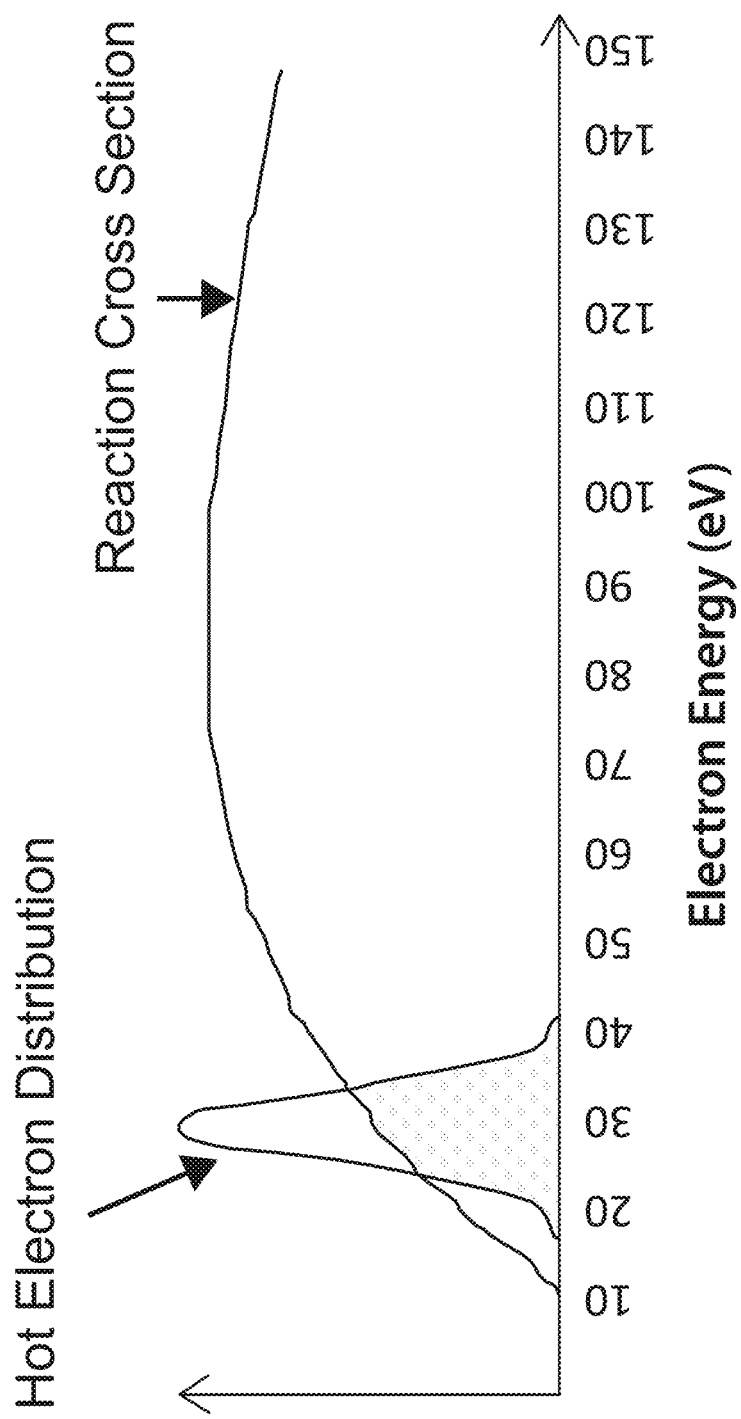
FIG. 1A-FIG. 1B depicts in accordance with various embodiments of the present invention, electron distribution of cold nanosecond pulsed plasma (high electron energy, low temperature plasma) (FIG. 1A), and photograph of cold plasma plume 3 cm long, 2 mm in diameter (FIG. 1B).
Figure 1B:
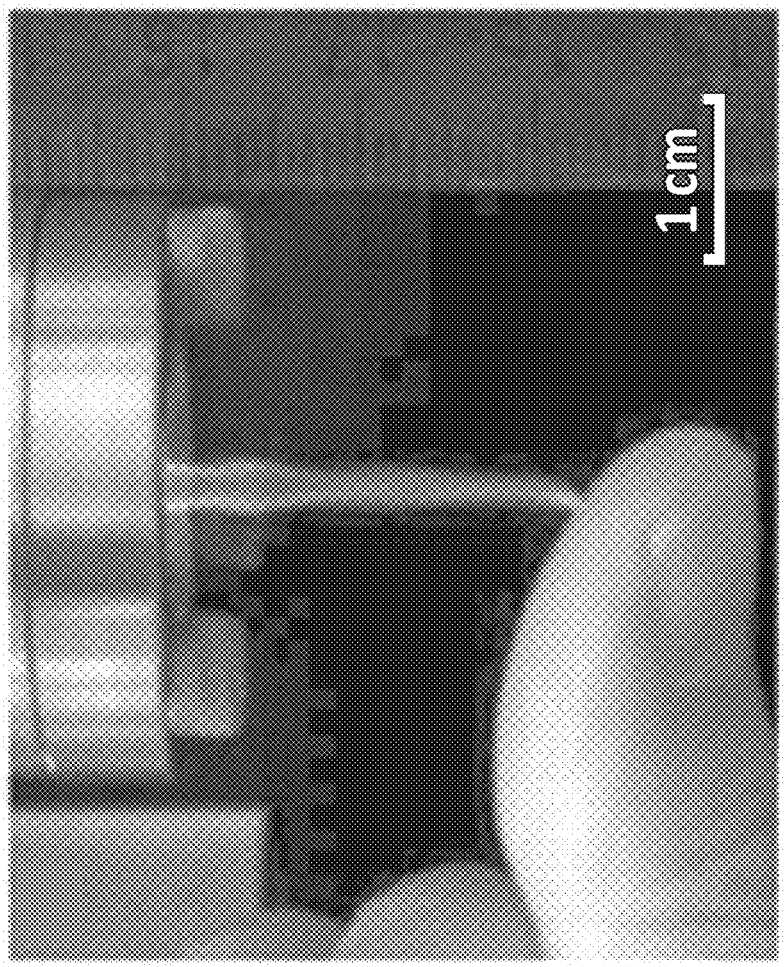

All references cited herein are incorporated by reference in their entirety as though fully set forth. Unless defined otherwise, technical and scientific terms used herein have the same meaning as commonly understood by one of ordinary skill in the art to which this invention belongs.

One skilled in the art will recognize many methods and materials similar or equivalent to those described herein, which could be used in the practice of the present invention. Other features and advantages of the invention will become apparent from the following detailed description, taken in conjunction with the accompanying drawings, which illustrate, by way of example, various features of embodiments of the invention. Indeed, the present invention is in no way limited to the methods and materials described. For convenience, certain terms employed herein, in the specification, examples and appended claims are collected here.

Unless stated otherwise, or implicit from context, the following terms and phrases include the meanings provided below. Unless explicitly stated otherwise, or apparent from context, the terms and phrases below do not exclude the meaning that the term or phrase has acquired in the art to which it pertains. Unless otherwise defined, all technical and scientific terms used herein have the same meaning as commonly understood by one of ordinary skill in the art to which this invention belongs. It should be understood that this invention is not limited to the particular methodology, protocols, and reagents, etc., described herein and as such can vary. The definitions and terminology used herein are provided to aid in describing particular embodiments, and are not intended to limit the claimed invention, because the scope of the invention is limited only by the claims.

As used herein the term "comprising" or "comprises" is used in reference to compositions, methods, systems, articles of manufacture, apparatus, and respective component(s) thereof, that are useful to an embodiment, yet open to the inclusion of unspecified elements, whether useful or not. It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). Although the open-ended term "comprising," as a synonym of terms such as including, containing, or having, is used herein to describe and claim the invention, the present invention, or embodiments thereof, may alternatively be described using alternative terms such as "consisting of" or "consisting essentially of."

Unless stated otherwise, the terms "a" and "an" and "the" and similar references used in the context of describing a particular embodiment of the application (especially in the context of claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. The abbreviation, "e.g." is derived from the Latin exempli gratia, and is used herein to indicate a non-limiting example. Thus, the abbreviation "e.g." is synonymous with the term "for example." No language in the specification should be construed as indicating any non-claimed element essential to the practice of the application.

"Optional" or "optionally" means that the subsequently described circumstance may or may not occur, so that the description includes instances where the circumstance occurs and instances where it does not.

"SOx" means sulfur oxides. Non-limiting examples of sulfur oxides include SO, $SO_2$, $SO_3$, $SO_4$, $S_2O$, $S_2O_2$, $S_7O_2$, $S_6O_2$, etc.

"NOx" means nitrogen oxides. Non-limiting examples of nitrogen oxides include NO, $NO_2$, $NO_3$, $N_2O$, $N_4O$, $N_2O_3$, $N_2O_4$, $N_2O_5$, etc.

The term "non-thermal plasma" as used herein means a plasma in which the electron energies (e.g., 30 eV or T=10^5 K) and the vibrational modes of the molecules in the plasma (e.g., close to room temperature) are out of thermal equilibrium.

In some embodiments, the numbers expressing quantities of reagents, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Herein, we disclose a method for enhancing the performance of wet SOx scrubber treatments (i.e., pollution control devices) by coupling a transient nanosecond pulsed plasma to the exhaust gas matrix. While existing technologies exist for reducing particulate matter (PM) and NOx efficiently (i.e., DPFs and SCRs), effective methods for removing SOx are still very much lacking. SOx wet scrubber technologies are severely limited by the low solubility of $SO_2$ in water, which is $10^{10}$ times lower than the solubility of $H_2SO_4$. Our plasma-based technology converts $SO_2$ to $H_2SO_4$ with high efficiency, thus, enabling near unity capture of sulfur products.

Our transient pulsed plasma is generated by a nanosecond high voltage pulse developed at USC. This transient pulsed approach consumes far less energy in the creation of the plasma than conventional RF sources. The transient nature of the plasma necessitates that very little current is drawn in creating the plasma. That is, once the streamer is created, the applied field collapses before a substantial amount of current (and hence electric power) can flow. Because of its transient nature, this is a cold plasma, in which the electron energies are around 30 eV ($T=10^5 K$), while the vibrational modes of the molecules remain at room temperature. These "hot" electrons enable new chemical pathways to be driven in the remediation of harmful sulfur oxide species. For example, atomic oxygen is one of the highly reactive chemical species that is produced in this cold plasma.

Figure 2A:
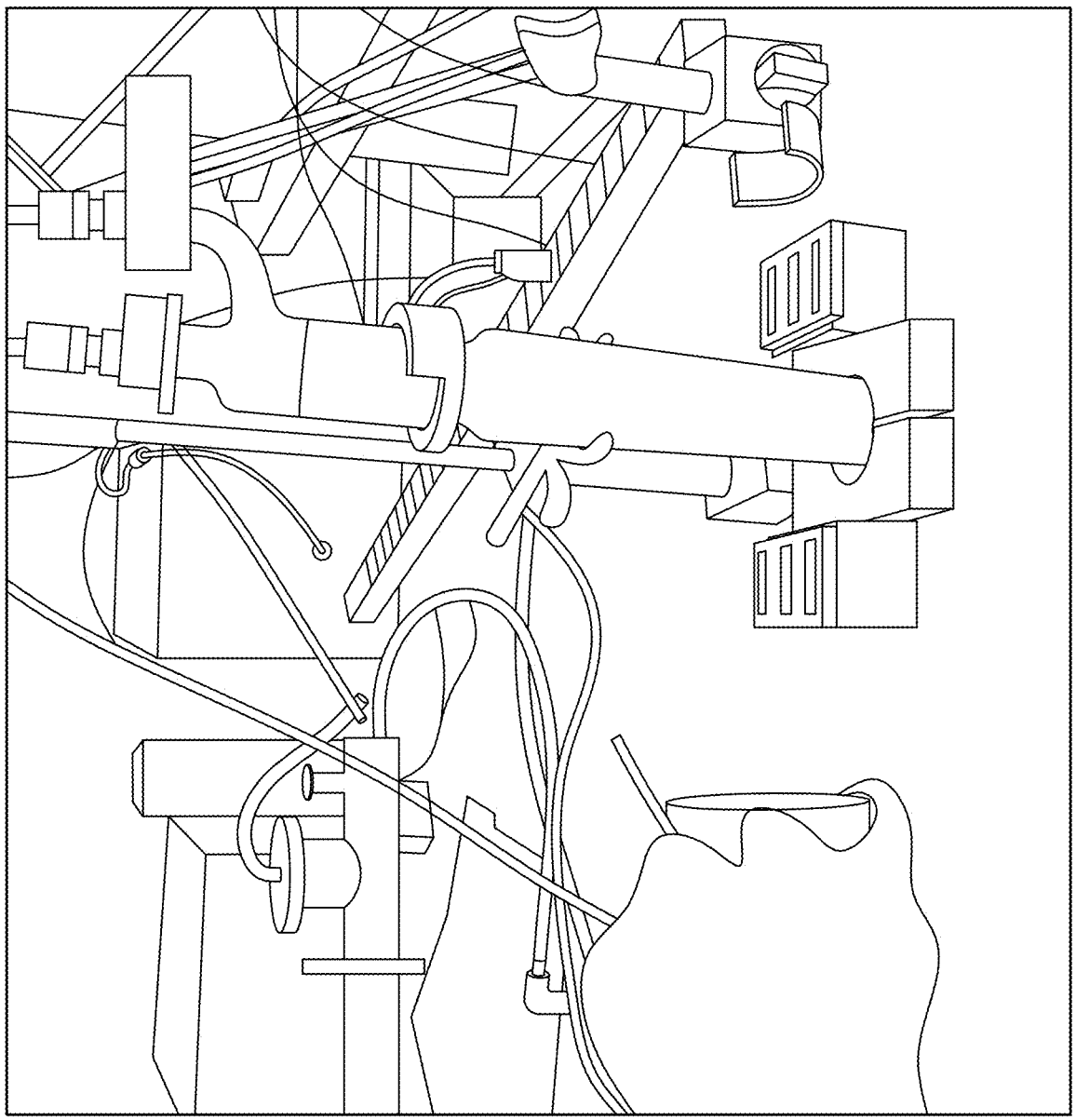
FIG. 2A-FIG. 2B depicts in accordance with various embodiments of the present invention, experimental setup used to demonstrate the plasma-enhanced SOx scrubber technology (FIG. 2A), and a schematic diagram used to demonstrate the plasma-enhanced SOx scrubber technology (FIG. 2B).
Figure 2B:
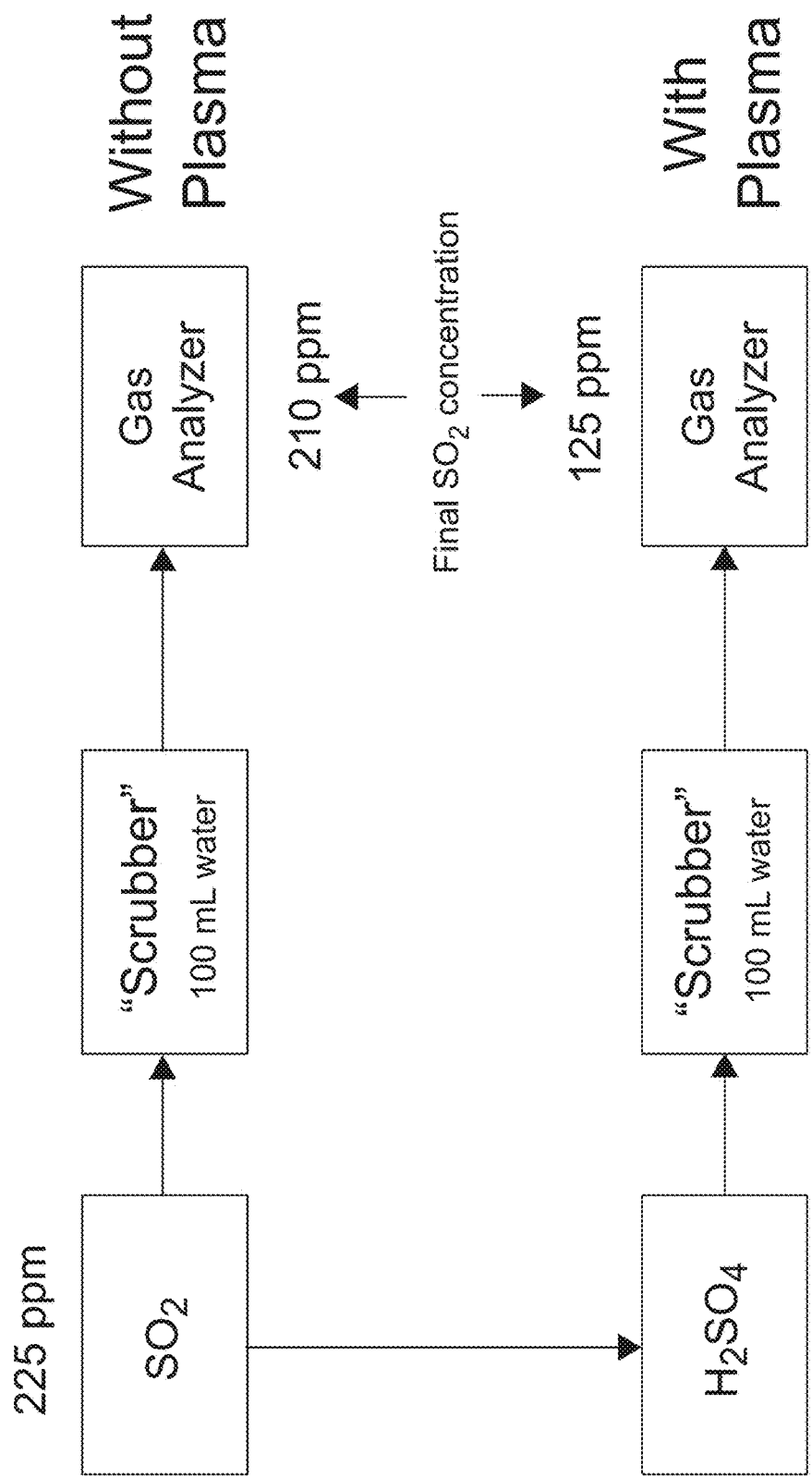

Using the simple experimental setup shown in FIG. 2A we have demonstrated a 7-fold improvement in $SO_2$ capture (from 6.6% to 44%). Here, a synthetic gas mixture containing 225 PPM of $SO_2$ is bubbled through 100 ml $H_2O$, while the residual gas is analyzed using a Horiba portable gas analyzer (FIG. 2B). Without the plasma, we observe a reduction in the $SO_2$ concentration to 210 PPM due to the capture in water (FIG. 2B). This represents a 6.6% reduction in $SO_2$. When the same $SO_2$ synthetic gas mixture is first passed through a transient plasma reactor (2" diameter) and then bubbled through 100 ml $H_2O$, the $SO_2$ content of the residual gas drops to 125 PPM, which corresponds to a 44% reduction in the $SO_2$ (FIG. 2B). Based on these values, we are able to achieve a 7-fold improvement in $SO_2$ capture (from 6.6% to 44%), demonstrating the effectiveness of the transient plasma to improve or enhance the SOx removal efficiency. The main mechanism here is that the plasma converts $SO_2$ to $H_2SO_4$, which has a solubility that is orders of magnitude higher than $SO_2$. This transient plasma-based approach enables SOx scrubbers to be designed with improved efficiencies using small volumes of water.

Our preliminary experiments have indicated that when an exhaust gas containing sulfur dioxide is subjected to a non-thermal plasma discharge, an amount of sulfuric acid (proportional to the energy density of the discharge) is formed. This sulfuric acid, when dissolved in a given volume of water, increases its ability to retain more sulfur dioxide than without the sulfuric acid, i.e. the solubility of sulfur dioxide in acidic water is higher than in neutral water. Furthermore, numerical simulations have shown that the bottleneck chemical reaction in the conversion of sulfur dioxide to sulfuric acid is $SO_3+H_2O \rightarrow H_2SO_4$. Therefore, increasing the concentration of water downstream of the discharge will increase the rate of this reaction and lead to higher remediation. These two benefits can be realized in an apparatus in which the exhaust gas is pumped from the bottom of a vertical manifold in which water is sprayed from the top and the plasma is discharged close to the water side. The acidified water captures sulfur dioxide that is flowing upward after which it gets drained at the bottom. In the presence of water, the transient plasma produces OH radicals (·OH), which drive the rate limiting step from $SO_2 \rightarrow HSO_3$, and the subsequent conversion to $H_2SO_4$. This step is particularly important because of the strong reverse reaction from $SO_3 \rightarrow SO_2$.

Using the experimental setup shown in FIG. 16 and FIG. 17A-FIG. 17C we wanted to determine if exhaust TPER treatment prior to scrubbing mechanism enhances scrubber performance. Without being bound by theory, we hypothesized that the remediation pathway of $SO_2$ removal leads to the conversion of $SO_2 \rightarrow H_2SO_4$ as a final product. The solubility of $H_2SO_4$ is much greater than $SO_2$, therefore repackaging sulfur in the form of the more soluble $H_2SO_4$ should result in the scrubber removing significantly more sulfur for a given quantity of scrubber water and power. Table 1, Table 2, and Table 3 below show the test parameters we used.

TABLE 1

Gas Component Variables

| Zero grade air | Flow rates typically |
| -or- | 5-10 slpm |
| $\Phi^* = 0.1$ to 1 | |
| $H_2O$ | Flow rates: 0.2-0.5 mL/min |

*$\Phi$ represents shorthand notation for varying ratios of $N_2$, $O_2$, $CO_2$, and $H_2O$. $\Phi = 0.3$ is the proxy used for diesel exhaust composition referenced to the Detroit Diesel.

TABLE 2

Composition Percentages (mass fractions)

| | Composition Percentages (mass fractions) | | | |
|---|---|---|---|---|
| $\Phi$ | $N_2$ % | $O_2$ % | $H_2O$ % | $CO_2$ % |
| 0.1 | 76.18 | 20.83 | 0.86 | 2.14 |
| 0.2 | 75.67 | 18.39 | 1.70 | 4.24 |
| 0.3 | 75.16 | 15.98 | 2.54 | 6.32 |
| 0.4 | 74.66 | 13.61 | 3.36 | 8.37 |

TABLE 3

Scrubber Solution Variables

| | |
|---|---|
| Empty-no solution | Acts as $H_2O$ trap for control expts |
| Deionized $H_2O$ | Volume of scrubber solution |
| Tap $H_2O$ | typically 100-250 mL |
| Acidified $H_2O$ | |
| Salt $H_2O$ (S = 35) | |

Using the experimental setup shown in FIG. 16 and FIG. 17A-FIG. 17C we hypothesized that Engineering controls could enable a sufficient amount kinetic evolution time for $SO_3$ (formed by TPER remediation of $SO_2$) to convert to $H_2SO_4$. If this conversion occurred prior to capture by a scrubber, the scrubber solution could then effectively capture the $H_2SO_4$ thereby acidifying the scrubber solution. This change in the scrubber matrix allows for more non-converted $SO_2$ to be captured by the scrubber. Experiments were conducted where the scrubber matrix was varied including acidified water with sulfuric acid as a proxy for gaseous sulfuric acid being deposited, tap water, and a salt solution with a salinity of 35 (similar to sea water). No enhancement of scrubber efficiency was found by varying the scrubber solution content. Table 4 below shows the test parameters we used.

TABLE 4

Static Scrubber Data

| Treatment | Scrub. vol., mL | Initial $SO_2$ ppm | Final $SO_2$ ppm | $\Delta SO_2$ ppm |
|---|---|---|---|---|
| $\Phi$ = 0.3, 6.48 slpm, mass fractions: $N_2$ 75.2% $O_2$ 16.0% $CO_2$ 6.3% $H_2O$ 2.4% | | | | |
| Pulser + $H_2O$ inject[1] | 0 | 485 | 470 | 15 |
| Scrubber only, tap $H_2O$ | 100 | 480 | 50 | 430 |
| Pulser + $H_2O$ inject[1] + Scrubber | 100 | 480 | 50 | 430 |
| Pulser + $H_2O$ inject[1] | 0 | 470 | 450 | 20 |
| Air, 6.48 slpm | | | | |
| Pulser + $H_2O$ inject[1] | 0 | 480 | 450 | 30 |
| Pulser only | 0 | 480 | 450 | 30 |
| Pulser + $H_2O$ inject[2] | 0 | 480 | 450 | 30 |
| Pulser + $H_2O$ inject[3] | 0 | 480 | 450 | 30 |
| Pulser + $H_2O$ inject[1] doubled kinetic evolution time with longer line | 0 | 480 | 450 | 30 |

$H_2O$ inject[1] rate: 0.2 mL/min
$H_2O$ inject[2] rate: 0.4 mL/min
$H_2O$ inject[3] rate: 1 mL/min Our static scrubber experiments showed (1) $SO_2$ remediation efficiencies are the same across all parameters tested in these experiments, (2) The water reservoir acting as a static scrubber removes the same amount of $SO_2$ with or without TPER, and (3) The amount of $SO_2$ removed by the scrubber is not affected by changing the composition of the water reservoir with the parameters tested. In conclusion, (1) The TPER remediation of 500 ppm of $SO_2$ with energy densities of 25 J/L is 15-30 ppm. This represents a remediation of 3.6 g/kWh, and is independent of gas composition and water injection rate under the conditions shown, (2) The kinetics indicate that for full conversion from $SO_3 \rightarrow H_2SO_4$ the residence time needed in a hot, humid environment is on the order of 3 minutes. With the scrubber positioned where it is, the kinetics are "frozen" at that time and further evolution from $SO_3$ to $H_2SO_4$ is quenched, and (3) Scrubber efficiency is independent of the content of scrubber solution under conditions tested.

Figure 18:
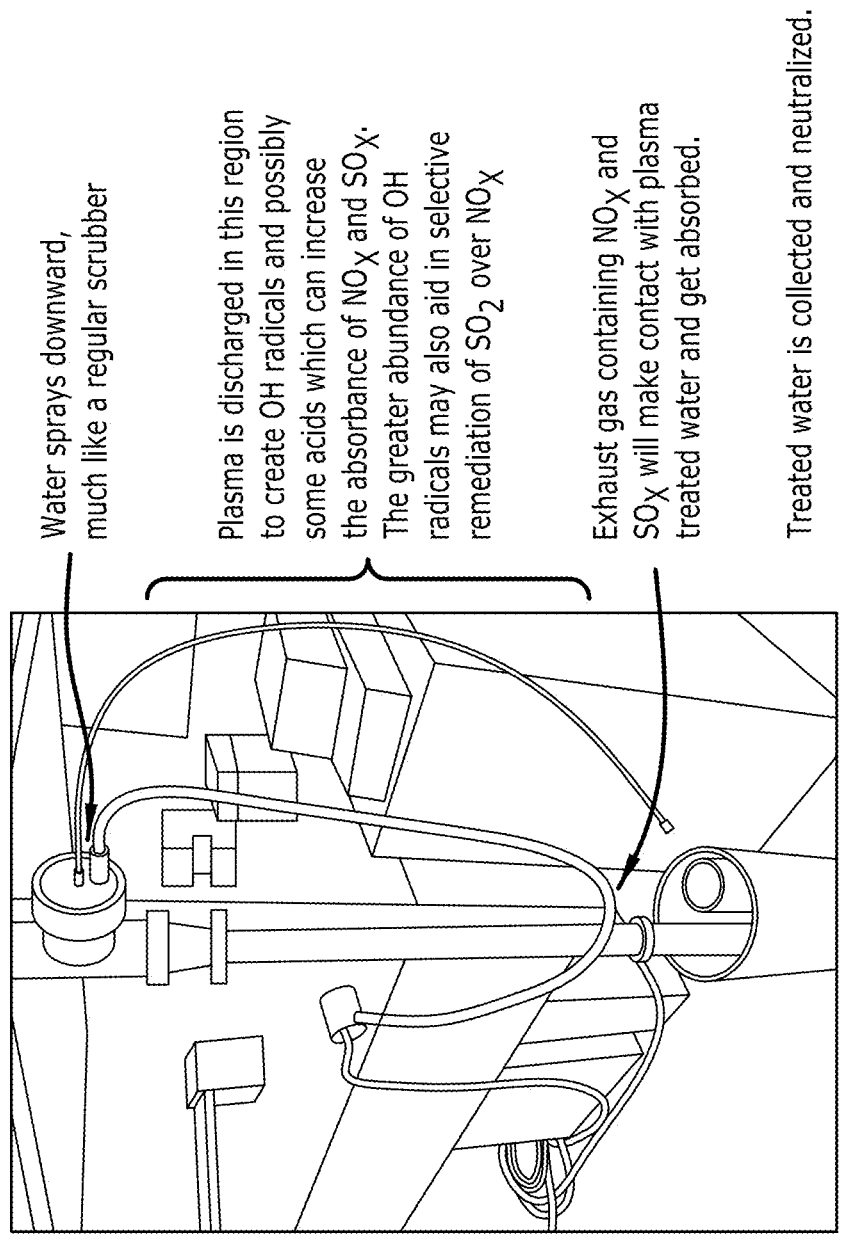
FIG. 18 depicts in accordance with various embodiments of the present invention a photograph of a dynamic scrubber and wet reactor apparatus. The development of this system represents apparatus for both studies, when pulser is turned off it is a dynamic scrubber and when turned on is a wet reactor.

Using the dynamic scrubber and wet reactor shown in FIG. 18 we designed a remediation system a remediation system in which water is injected in the vicinity of the plasma discharge. It is postulated that this discharge in the presence of liquid water can generate a higher population of hydroxyl radicals (·OH)n. The resulting OH radicals (·OH), if sufficient in concentration, will improve the conversion of $SO_2$ to $H_2SO_4$. Without being bound by theory we hypothesized that there are two pathways to acid formation for $SO_2$:

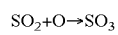

$$SO_2 + O \rightarrow SO_3$$

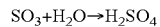

$$SO_3 + H_2O \rightarrow H_2SO_4 \qquad 1)$$

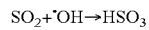

$$SO_2 + \cdot OH \rightarrow HSO_3$$

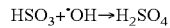

$$HSO_3 + \cdot OH \rightarrow H_2SO_4 \qquad 2)$$

Our test objectives for the dynamic scrubber and wet reactor shown in FIG. 18 were (1) Determine if injection of water (vaporized) *upstream* of the plasma may help prevent arcing; (2) Determine if injection of water (condensed) *downstream* of the plasma may help improve remediation by producing an increased concentration of OH radicals and acids; and (3) To directly quantify the impact of competition of PM with $SO_2$ remediation by removing the competition of NOx with $SO_2$ remediation.

As shown in the dynamic scrubber and wet reactor shown in FIG. 18, (1) Water sprays downward, much like a regular scrubber; (2) Plasma is discharged in this region to create OH radicals and possibly some acids which can increase the absorbance of NOx and SOx; (3) The greater abundance of OH radicals may also aid in selective remediation of $SO_2$ over NOx; (4) Treated water is collected and neutralized; and (5) The development of this system represents apparatus for both studies, when pulser is turned off it is a dynamic scrubber and when turned on is a wet reactor.

Figure 3:
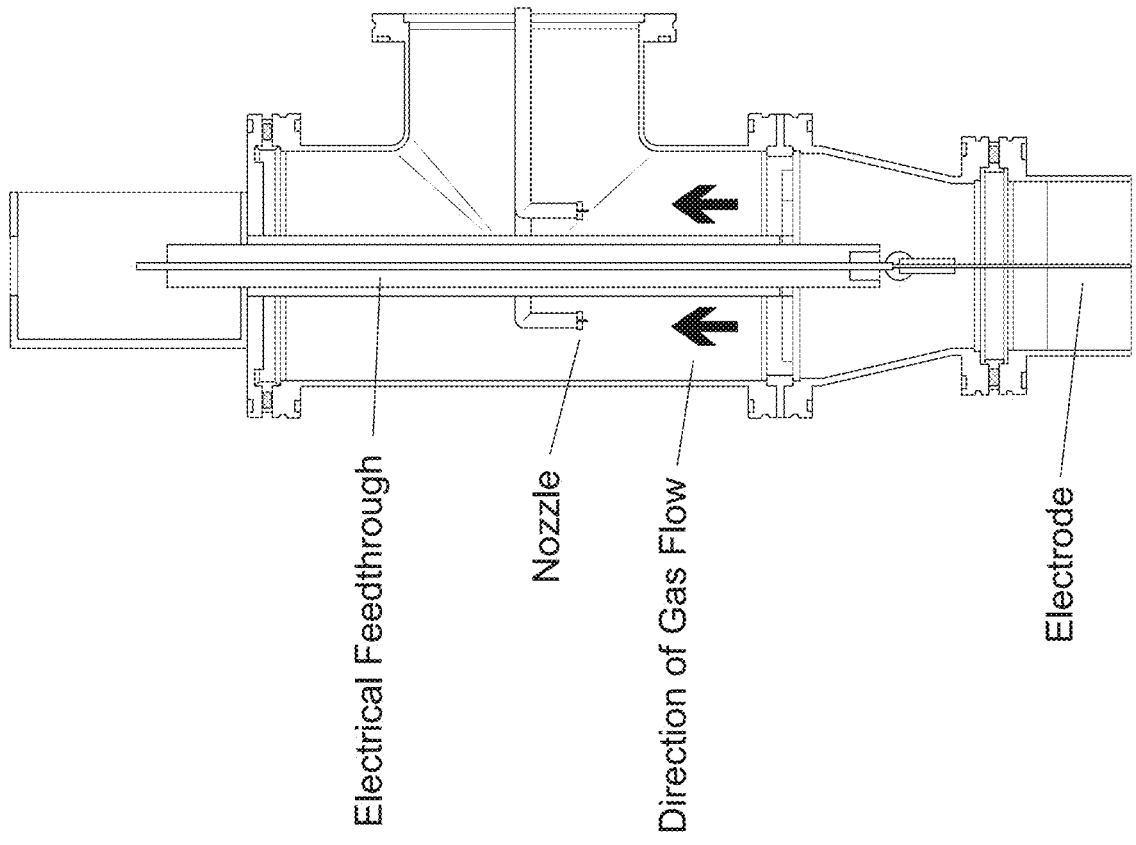
FIG. 3 depicts in accordance with various embodiments of the present invention a system for plasma-based SOx and NOx remediation.

FIG. 3 shows a system for gas (e.g., exhaust gas) remediation that includes a flow reactor coupled to a gas source (not shown). For example, if the gas source is an engine, the gas source (e.g., engine) emits gas (e.g., exhaust gas) that includes $SO_x$ molecules, including $SO_2$. In some implementations, the engine is a diesel engine, and the exhaust gas is diesel exhaust. Generally, $SO_2$ is produce as a by-product of the burning of fossil fuels containing sulfur compounds, such as on ships. $SO_2$ is considered to be an environmental criteria pollutant. The plasma reactor includes an internal chamber that is fluidly connected to the engine such that the exhaust gas flows into the internal chamber. An electrode is disposed within the internal chamber of the plasma reactor. The electrode is electrically coupled to an electrical pulse source via the electrical feedthrough. The electrical pulse source repeatedly delivers electrical pulses to the electrode to form a plasma from the exhaust gas.

Figure 4C:
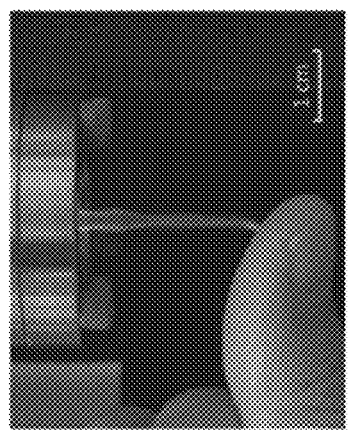
FIG. 4A-FIG. 4C depicts in accordance with various embodiments of the present invention a transient plasma formed by a high voltage nanosecond pulse approach (FIG. 4A), an electron distribution of cold nanosecond pulsed plasma (FIG. 4B), and a cold plasma plume (FIG. 4C).
Figure 4B:
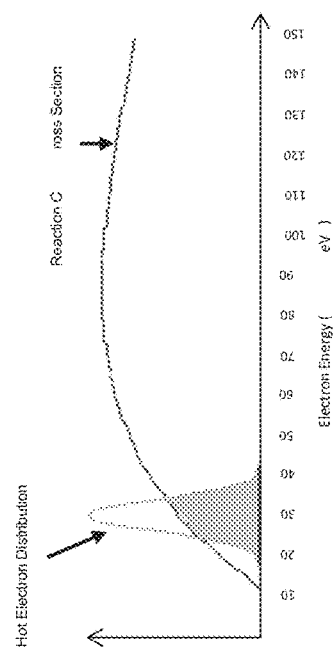
Figure 4A:
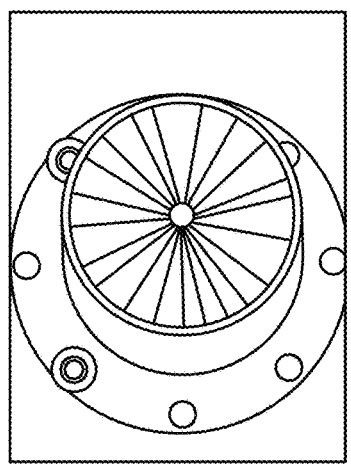

In some implementations, the flow reactor forms a cylindrical stainless-steel anode, and the electrode is a center wire cathode electrode. The pulse generator can be a high voltage nanosecond pulse generator, such as a Transient Plasma Systems Model 30X or a Transient Plasma Systems Model 40X. FIG. 4A illustrates a transient plasma (e.g., a hot electron, low-temperature plasma) that can be formed by the flow reactor using the high voltage nanosecond approach. FIG. 4B shows the electron distribution of cold nanosecond pulsed plasma. FIG. 4C shows a cold plasma plume that is about 3 centimeters in diameter and about 2 millimeters in length.

Figure 5A:
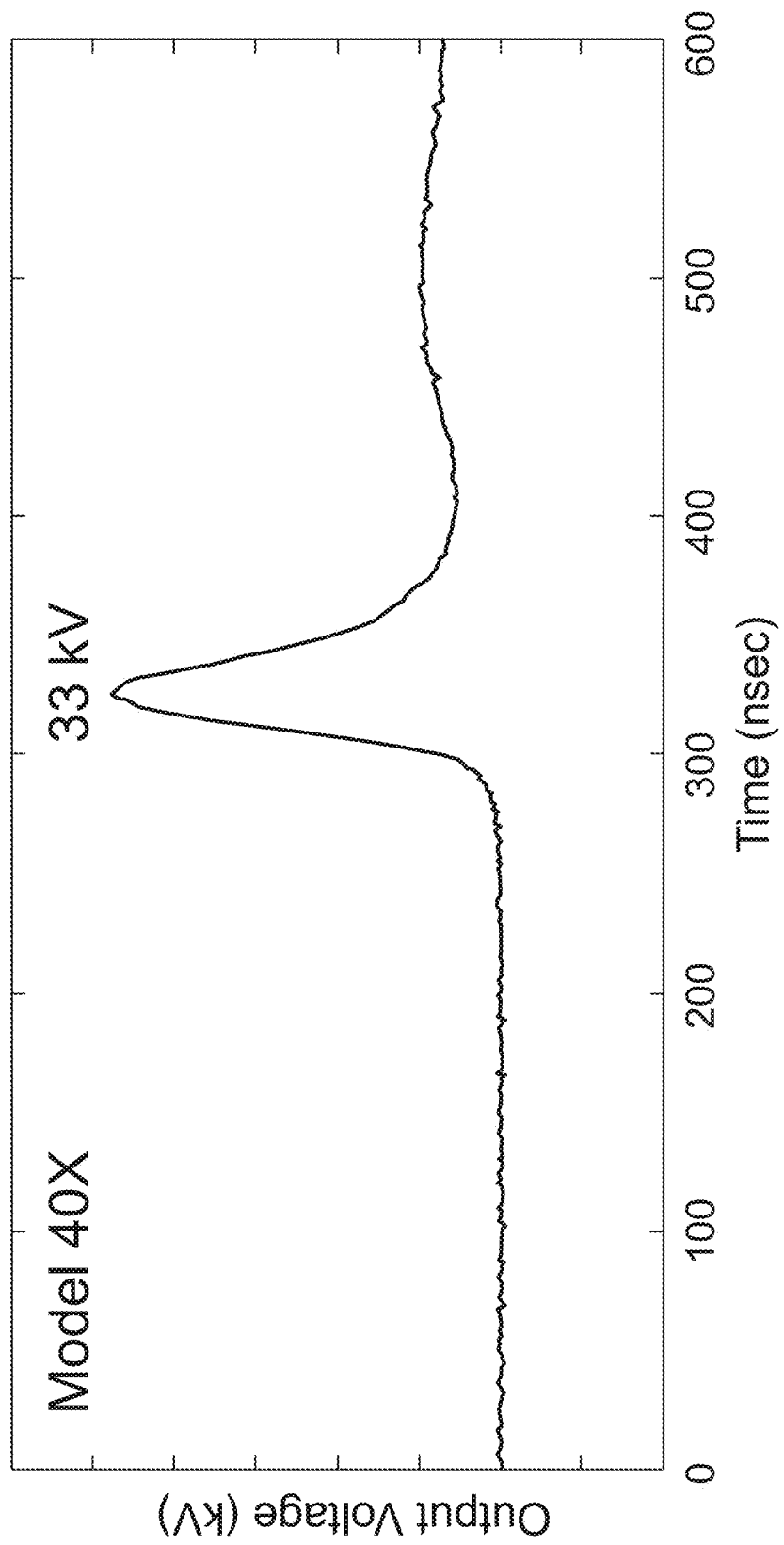
FIG. 5A-FIG. 5B depicts in accordance with various embodiments of the present invention a plot of the output voltage of a first type of pulse generator (FIG. 5A), and a plot of the output voltage of a second type of pulse generator (FIG. 5B).
Figure 5B:
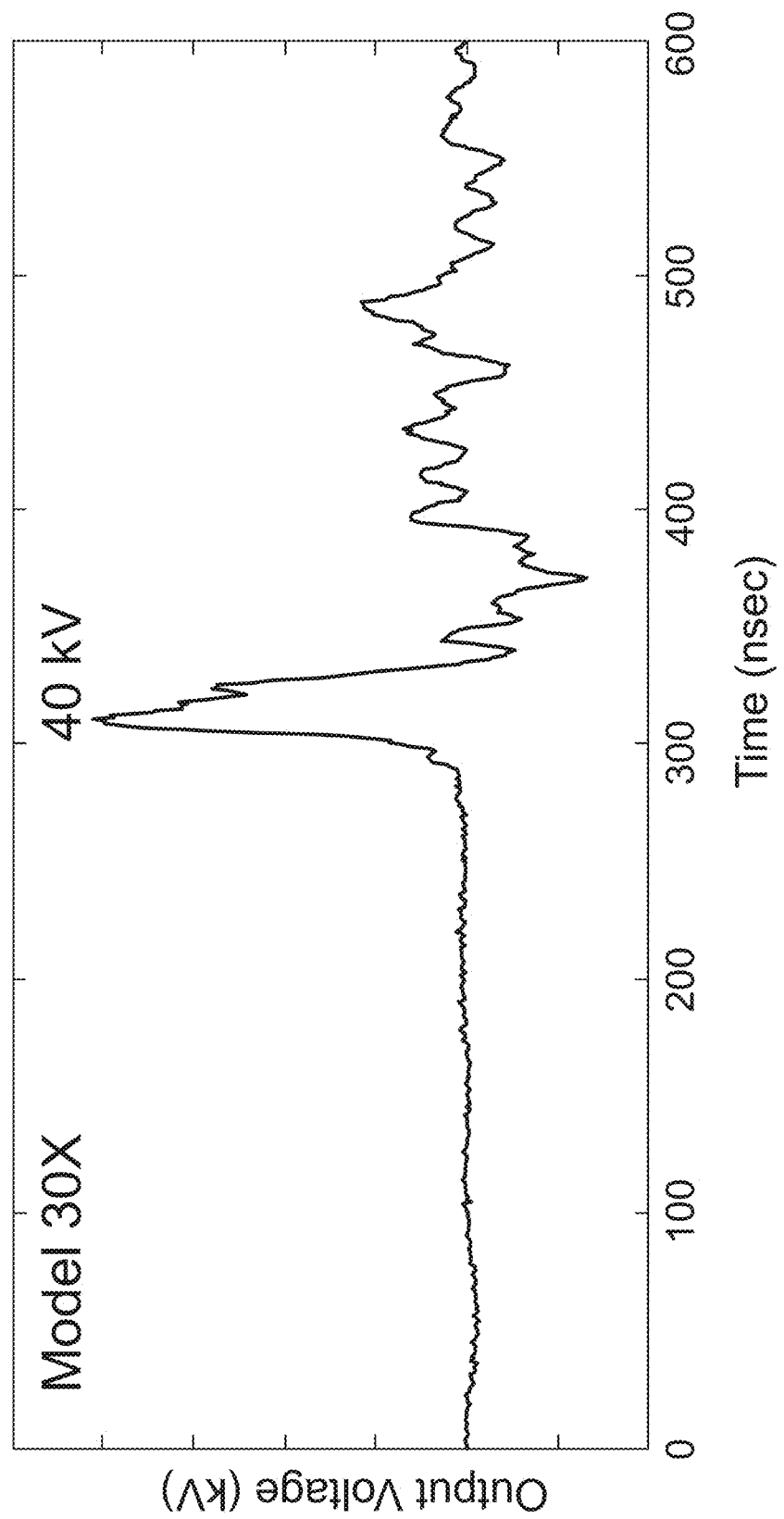

The Model 40X pulse generator has a peak voltage of about 33 kilovolts (kV), a pulse rise time of about 17 nanoseconds (ns), a full width half maximum (FWHM) of about 30 ns, a maximum energy per pulse of about 88 millijoules (mJ), and a maximum repetition rate of about 800 hertz (Hz). The Model 30X has a peak voltage of about 40 kV, a pulse rise time of about 7 ns, a FWHM of about 10 ns, a maximum energy per pulse of about 66 mJ, and a maximum repetition rate of about 200 Hz. FIG. 5A is a plot of the output voltage of the Model 40X pulse generator, showing the peak voltage of about 33 kV. FIG. 5B is a plot of the output voltage of the Model 30X pulse generator, showing the peak voltage of about 40 kV. Generally, nanosecond pulsed plasma consumes less energy during the creation of the plasma as compared to radio frequency (RF)-based plasma reactors, and thus draws very little current during creation. Nanosecond pulsed plasma is thus extremely efficient from an energy and power standpoint.

Referring back to FIG. 3, the system also includes a water source that is configured to inject water into the flow reactor. In the implementation illustrated in FIG. 3, the water source is formed from a nozzle fluidly coupled to a water reservoir or other storage tank or device. The nozzle is configured to aerosolize the water such that the water is injected into the flow reactor in the form of water droplets. The water can also be in the form of water vapor.

During operation, the water is injected into the internal chamber of the flow reactor as the electrical pulses are delivered to the electrode to form the plasma. As the pulsing occurs, molecules of the hydroxyl radical (denoted by the symbol ·OH) are generated. The ·OH molecules are the neutral form of the hydroxide ion (OH·), which is formed as part of the self-ionization (or autoionization) of the water. One mechanism for production of the ·OH molecules is to inject water into the internal chamber of the flow reactor. The electrical pulses delivered to the electrode free an electron from the hydroxide ions, thus forming the ·OH molecules.

The $SO_2$ molecules react with ·OH molecules to form $HSO_3$ molecules, which in turn react with ·OH molecules and water molecules to form $H_2SO_4$ molecules. The $H_2SO_4$ molecules can then be removed from the flow reactor using a wet scrubber, which utilizes water molecules to remove the $H_2SO_4$ molecules with near unity capture. The capture of the $H_2SO_4$ molecules is governed by the solubility of $H_2SO_4$ in water, and the nature of complete acid dissociation. In some implementations, the capture rate of the $H_2SO_4$ molecules (e.g., the amount of water molecules needed to capture the $H_2SO_4$ molecules) is about 90%, between about 90% and about 100%, about 95%, or greater than about 99%. Generally, existing wet scrubber technologies are severely limited by the low solubility of $SO_2$ in water, which is up to 100 times lower than the solubility of $H_2SO_4$. With the system illustrated in FIG. 3, the plasma discharge in the presence of aerosol condensed phased water drives the conversion of $SO_2$ to $H_2SO_4$, which allows for more efficient remediation of the $SO_2$ molecules in the exhaust gas as compared to techniques without the use of water, which generally only achieve 35% removal efficiency.

As shown in FIG. 3, the gas (e.g., exhaust gas) generally flows through the flow reactor in a first direction. The water is injected from the nozzles in a second direction that is generally parallel and opposed to the first direction, e.g., the water droplets are injected in the opposite direction to the gas (e.g., exhaust gas) flow that is being treated. This counter-flow geometry increases the effectiveness of the water droplets both in generating the ·OH molecules, and in removing the resulting $H_2SO_4$ molecules.

Figure 6:
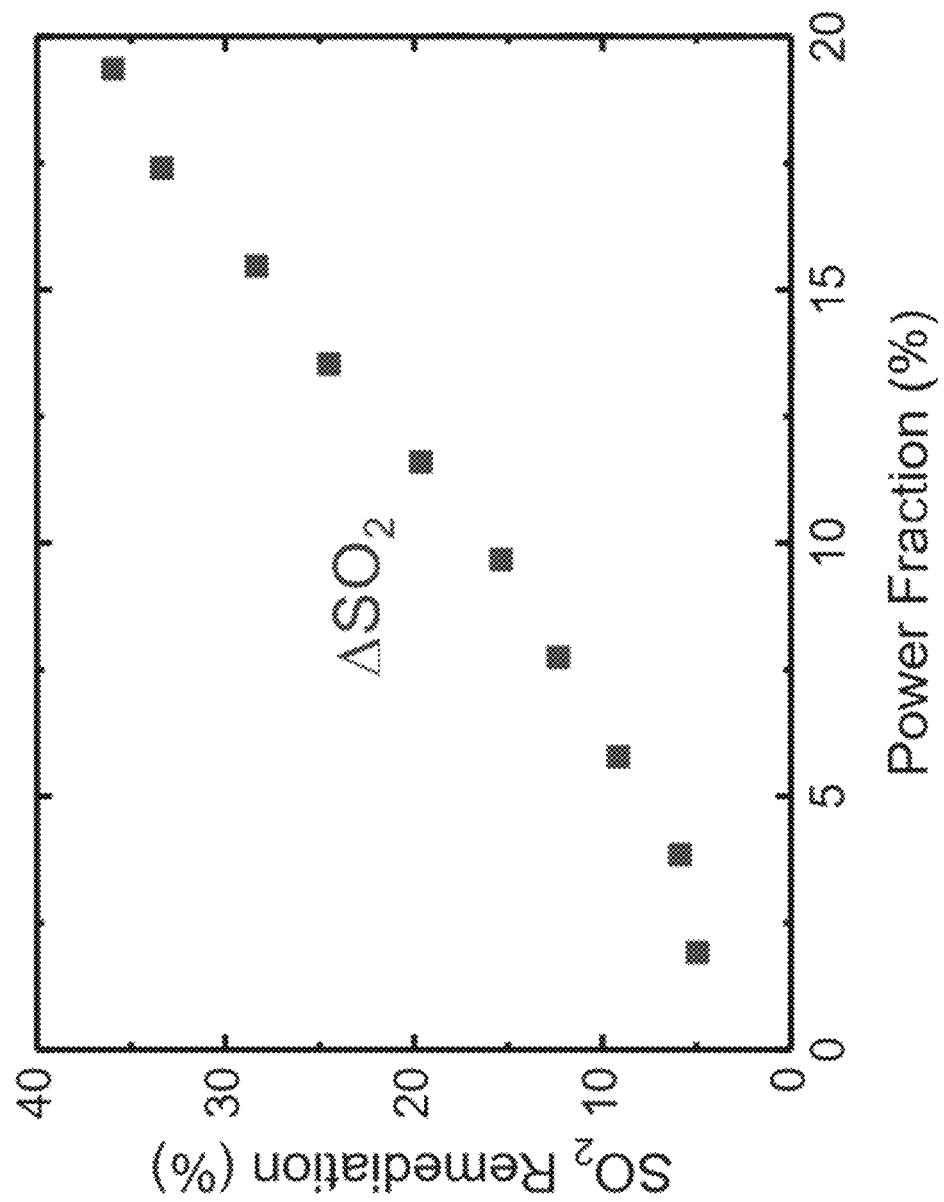
FIG. 6 depicts in accordance with various embodiments of the present invention a plot of the $SO_2$ removal efficiency measured as a function of the fraction of engine power needed to produce the plasma.
Figure 7:
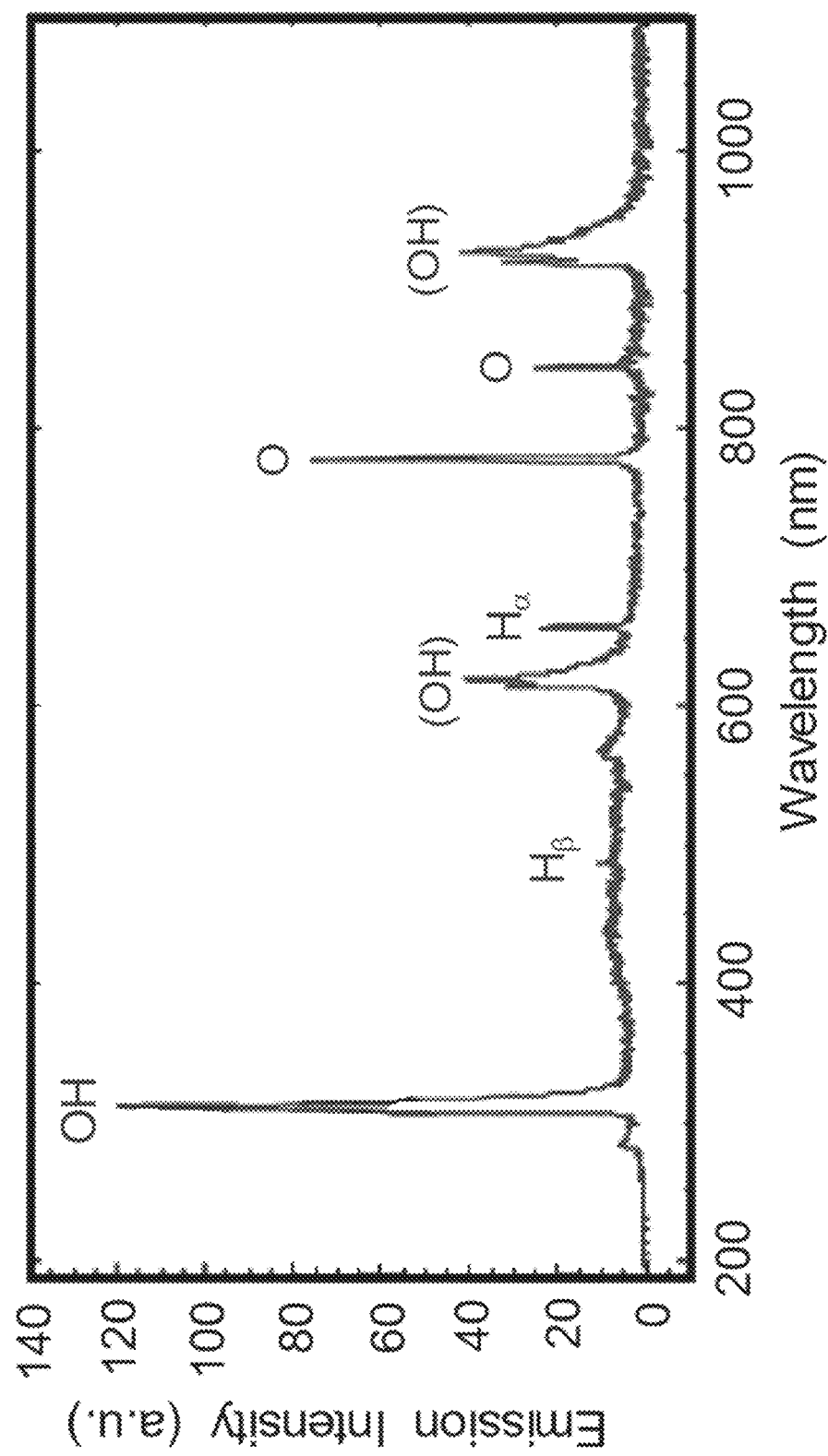
FIG. 7 depicts in accordance with various embodiments of the present invention an emission spectrum from a pulsed discharge in water.

FIG. 6 is a plot of the $SO_2$ removal efficiency measured as a function of the fraction of the gas source (e.g., engine) power needed to produce the plasma, without the injection of water into the flow reactor. The $SO_2$ removal efficiency is measured as a percentage of the $SO_2$ in the gas (e.g., exhaust gas) that is removed during the remediation process. Higher efficiencies are achievable by injecting the water droplets as disclosed herein. FIG. 7 is a plot of the emission spectrum from a pulsed discharge of the flow reactor of FIG. 3 in water.

Herein we report a substantial enhancement in the removal of gaseous $SO_2$ by discharging a transient nanosecond pulsed plasma in a water vapor-saturated gas mixture. With the plasma alone (i.e., "dry"), the $SO_2$ remediation is limited to approximately 15% reduction in $SO_2$ (i.e., $\Delta SO_2$=65 ppm). In presence of water vapor, we observe 84% remediation ($\Delta SO_2$=500 ppm) during plasma discharge due to the availability of OH radicals. Here, there is a synergistic effect of adding water vapor to the gas mixture in which the plasma excites highly reactive OH radical species that drive a two-step reaction process: $SO_2$+·OH→$HSO_3$ and the subsequent reaction of $HSO_3$+·OH→$H_2SO_4$, which precipitates out in the aqueous phase. The efficacy of this approach increases as we increase the temperature of the gas matrix, indicating the relatively low barriers of this reaction, which is consistent with the OH-driven reaction pathway, and it also increases with plasma density, thus demonstrating the scalability of this approach. Plasma emission spectroscopy as well as Raman scattering spectroscopy provide spectroscopic evidence of the OH radical species, further substantiating the OH reaction intermediate mechanism. This approach provides a promising mitigation strategy for the continued use of high sulfur fuels (i.e., bunker fuel).

Sulfur dioxide ($SO_2$) is a toxic gas produced as a by-product of the burning of fossil fuels containing sulfur compounds. These high sulfur-containing fuels are almost exclusively used by the international shipping industry, and the international Marine Organization (IMO) has set a global limit for sulfur in fuel oil used on board ships of 0.50% m/m (mass by mass) starting 1 Jan. 2020. The previous global limit for sulfur content of ships' fuel oil was 3.5% (i.e., heavy fuel oil). Currently, heavy fuel oil (also known as "Bunker Fuel") comprises 4% of every barrel of crude oil, which corresponds to 10,000 tons of sulfur emissions globally each day. The new 2020 global limit of 0.50% corresponds to an 85% reduction in $SO_2$, which we believe can be achieved with our plasma-based approach.

$SO_2$ remediation remains challenging. In diesel exhaust, this problem is exacerbated because of the presence of NO, which rapidly consumes a vast majority of the oxygen radicals in the plasma, via the reaction NO+O→$NO_2$. As such, the NO remediation reaction serves as a competing reaction pathway, which rapidly consumes most of the plasma-generated radicals. While existing technologies exist for reducing NOx efficiently (i.e., selective catalytic reduction (SCRs)), effective methods for removing $SO_2$ are still very much lacking. $SO_2$ wet scrubber technologies are limited by the low solubility of $SO_2$ in water, which is several orders of magnitude lower than the solubility of $H_2SO_4$. Therefore, one strategy for $SO_2$ remediation is to first convert $SO_2$ to $H_2SO_4$ and then capture in $H_2O$ using a "wet scrubber" with nearly unity capture.

Others have investigated a single-stage wet plasma reactor for the simultaneous removal of NOx, SOx, and particulates by flowing $Na_2SO_3$ and NaOH solutions along the inner wall of the reactor. However, the reaction pathways and temperature dependences of these reactions remain poorly understood. While $SO_2$ is more soluble in water than $CO_2$, there are several equilibrium processes that occur between $SO_2$ and various hydrogenated and oxygenated species (e.g., $HSO_3^-$). We have the following reactions/equilibria:

$$SO_2^0(aq)+H_2O(l) \rightleftharpoons H^+(aq)+HSO_3^-(aq) \quad (A)$$

$$HSO_3^-(aq) \rightleftharpoons H^+(aq)+SO_3^{2-}(aq) \quad (B)$$

$$2HSO_3^+(aq) \rightleftharpoons S_2O_5^{2-}(aq)+H_2O(l) \quad (C)$$

$$SO_2(g) \rightleftharpoons SO_2^0(aq) \quad (D)$$

$$SO_2(g)+H_2O(l) \rightleftharpoons H^+(aq)+HSO_3^-(aq) \quad (E)$$

Once equilibrium is reached with these back reactions, the remediation is limited, and no further $SO_2$ can be removed from the system. This plasma-based approach enables us to circumvent the standard $SO_2(g)/H_2SO_4^0(aq)$ equilibria, thus, enhancing the $SO_2$ remediation process.

In various embodiments of the present invention, we demonstrate a method for improving $SO_2$ remediation using plasma discharge in in a heated, plasma-driven reactor in the presence of water vapor. We present a systematic study of this reaction as a function of temperature and plasma density. A comparison of $SO_2$ reduction carried out under wet and dry conditions was performed in order further understand the synergistic roles of water vapor and plasma discharge. In various embodiments of the present invention we also provide spectroscopic evidence of the OH radicals, in order to substantiate the hypothetical OH-driven reaction pathway, which represents an important, short-lived reaction intermediate species.

Figure 8A:
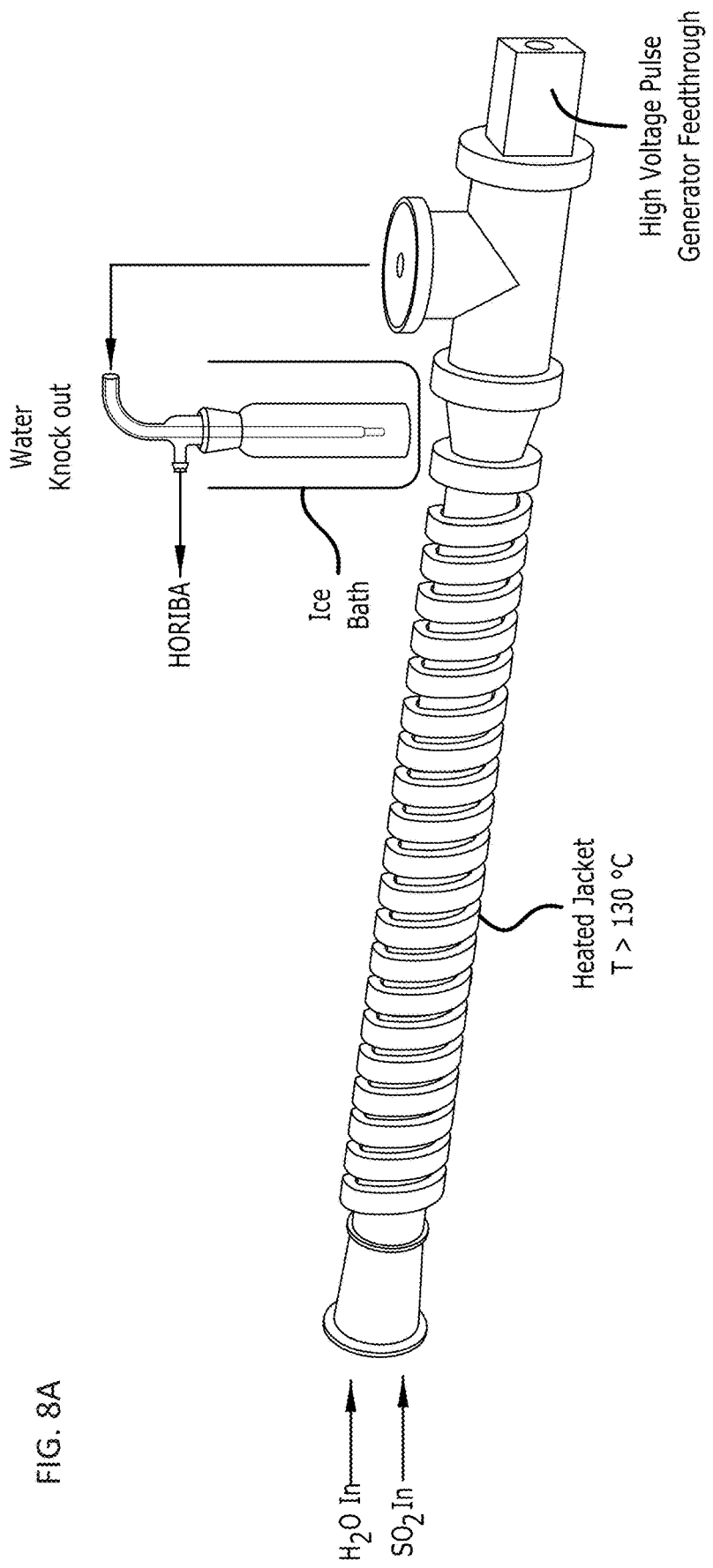
FIG. 8A-FIG. 8C depicts in accordance with various embodiments of the present invention, a schematic diagram of the experimental setup used to test the transient pulsed plasma reactor (FIG. 8A), typical output characteristics of nanosecond high voltage pulse generator (FIG. 8B), and photograph of the transient plasma (hot electron, low-temperature plasma) formed by the high voltage nanosecond pulse (FIG. 8C).
Figure 8C:
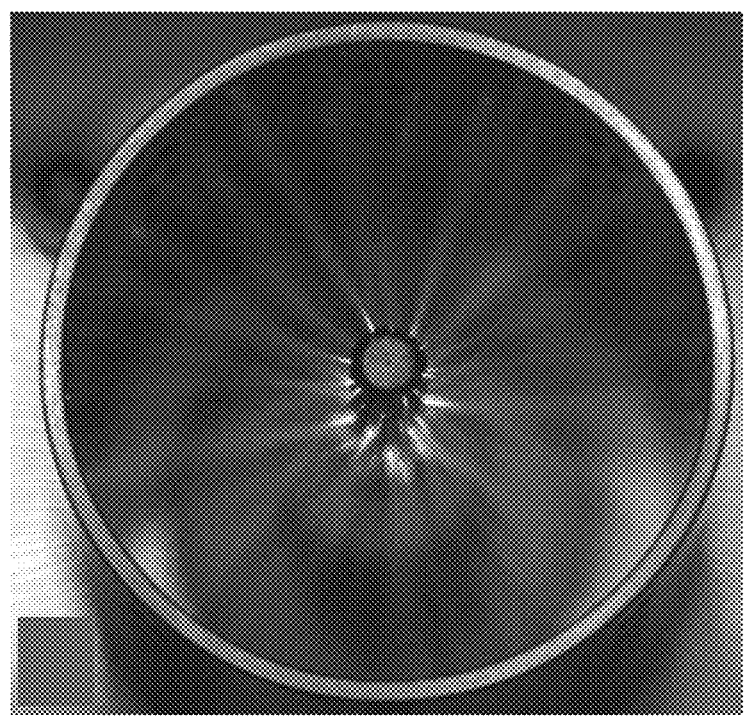
Figure 8B:
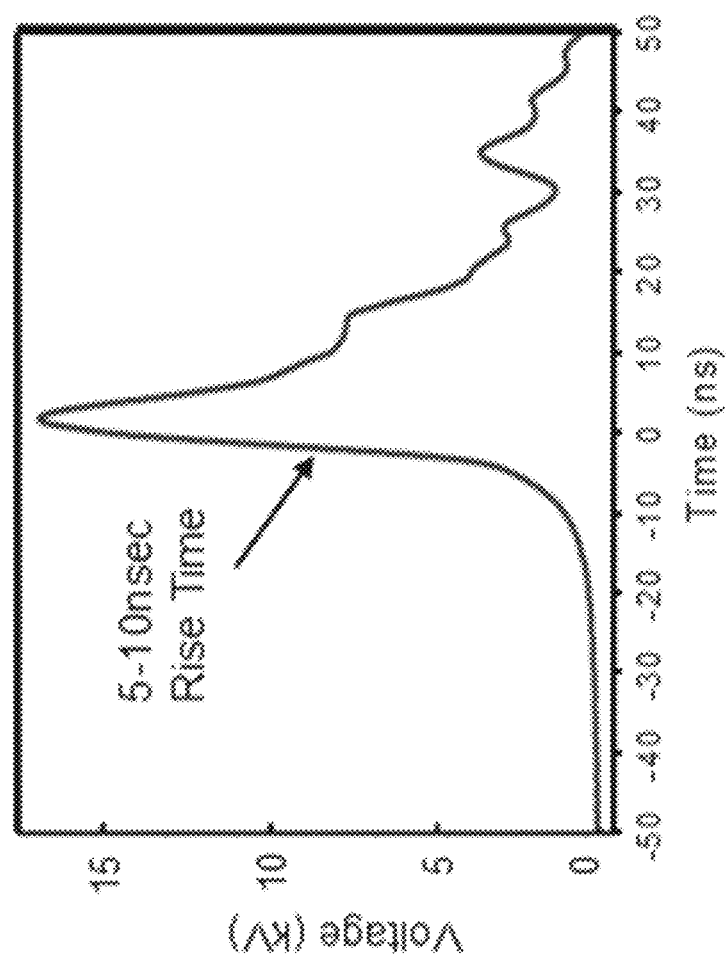

In the work presented herein, we utilize a transient pulsed plasma discharge in a coaxial reactor. As illustrated in FIG. 8A, the plasma-based flow reactor consists of a 3 ft-long, 2 inch-diameter stainless steel cylindrical anode with a single-wire cathode center electrode. The plasma is produced using a TPS Model 20X pulse generator (Transient Plasma Systems, Inc.) operating at a peak voltage of 17 kV, pulse repetition rates up to 2000 Hz, and continuous powers up to 800 W. Here, the plasma density is varied by adjusting the pulse repetition rate. A typical waveform produced by this pulse generator is plotted in FIG. 8B. The nanosecond pulsed plasma used here consumes far less energy in the creation of the plasma than radio frequency (RF) based plasma. The transient nature of the plasma necessitates that very little current is drawn in creating the plasma. That is, once the streamer is created, the applied field collapses before a substantial amount of current (and hence electric power) can flow. Because of its transient nature, this is a cold plasma, in which the electron energies are around 30 eV ($T=10^5$ K), while the vibrational modes of the molecules remain at room temperature. These "hot" electrons enable new chemical pathways to be explored in the formation of energetic intermediate species that are otherwise not possible to make through standard equilibrium chemistry. At a peak voltage 17 kV, our system delivers a transient power of 4.76 MW. $SO_2$ concentrations were measured using a Horiba portable gas analyzer (model PGA-350) with a sample rate of 0.5 L/min after passing through a water knock out. Our synthetic gas mixture was prepared by mixing neat $SO_2$ gas with compressed dried air to 500 ppm by volume. Water aerosol (i.e., approximately 100 nm diameter nanoparticles) was injected into the reactor using an ultrasonic nozzle. This is a heated reactor, in which the sidewalls of the reactor are kept above 100° C., meaning that all $H_2O$ stays in the gas phase during the residence time in the reactor.

Figure 9A:
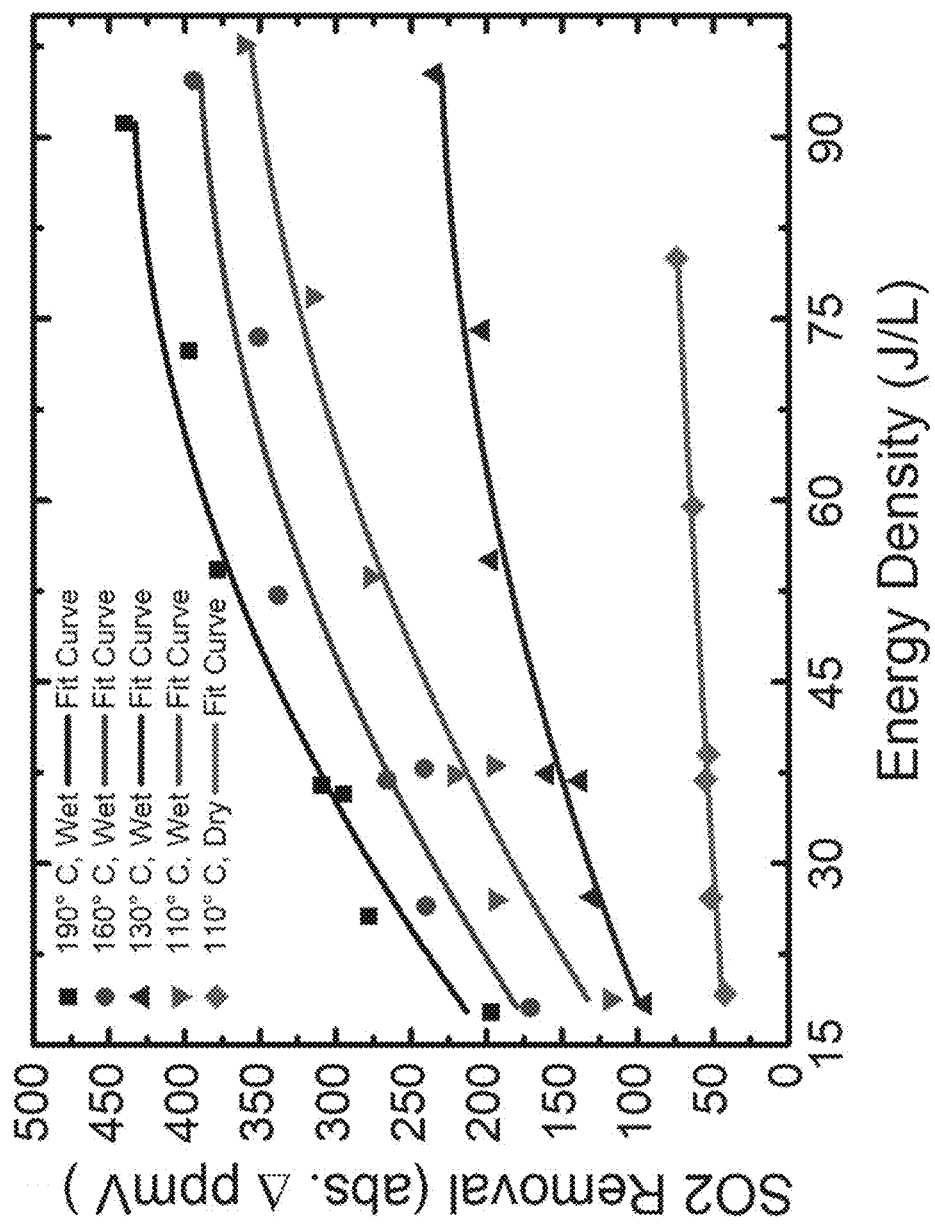
FIG. 9A-FIG. 9B depicts in accordance with various embodiments of the present invention, a temperature dependent $SO_2$ remediation study on approximately 600 ppmV synthetic $SO_2$ in a humidified air matrix (FIG. 9A), and a temperature dependent $SO_2$ remediation study on approximately 600 ppmV synthetic $SO_2$ in a humidified air matrix (FIG. 9B).
Figure 9B:
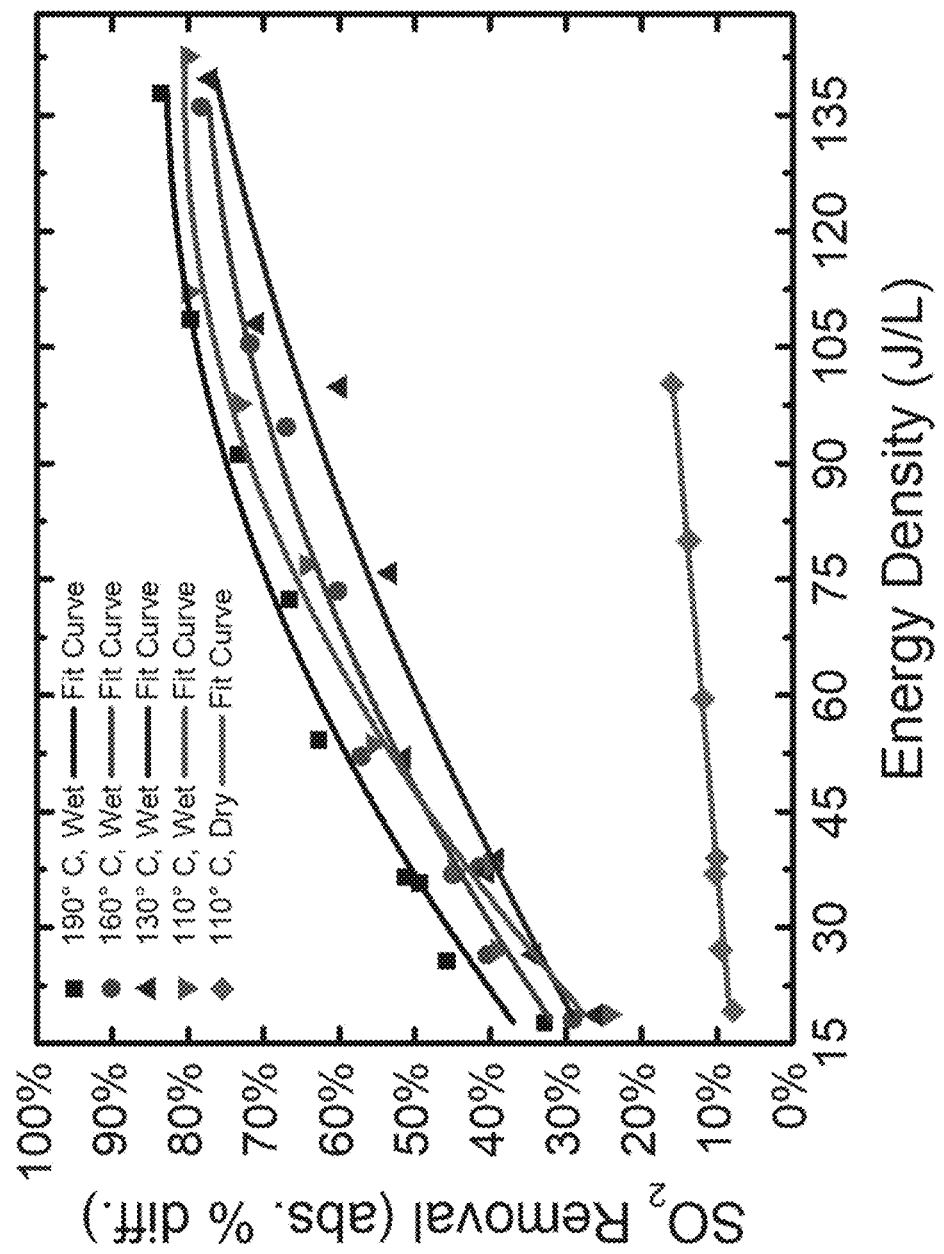

FIG. 9A shows a plot of the absolute $SO_2$ removal (in units of Δppm as measured by volume) brought about by the plasma discharge. As a comparison, we measure the removal efficacy in dry $SO_2$ in air (i.e., without water vapor injection). Here, we see that only about 65 ppm (or 15%) of the $SO_2$ is removed with plasma discharge and is largely independent of plasma density. This behavior reflects the limitation in the availably of OH radicals without the injection of water. That is, there are simply not enough OH radicals in the plasma to remediate all of the $SO_2$ and, therefore, much of the plasma's energy goes into generating oxygen radicals which drive the back reactions to 502. FIG. 9A shows our results taken at moderate plasma densities (i.e., up to 100 J/L), and FIG. 9B shows results taken at high plasma densities (i.e., up to 145 J/L). Here, we observe a dramatic increase in the presence of water injection, yielding 84% (500 ppm) removal of $SO_2$ in the humidified gas matrix.

Figure 10A:
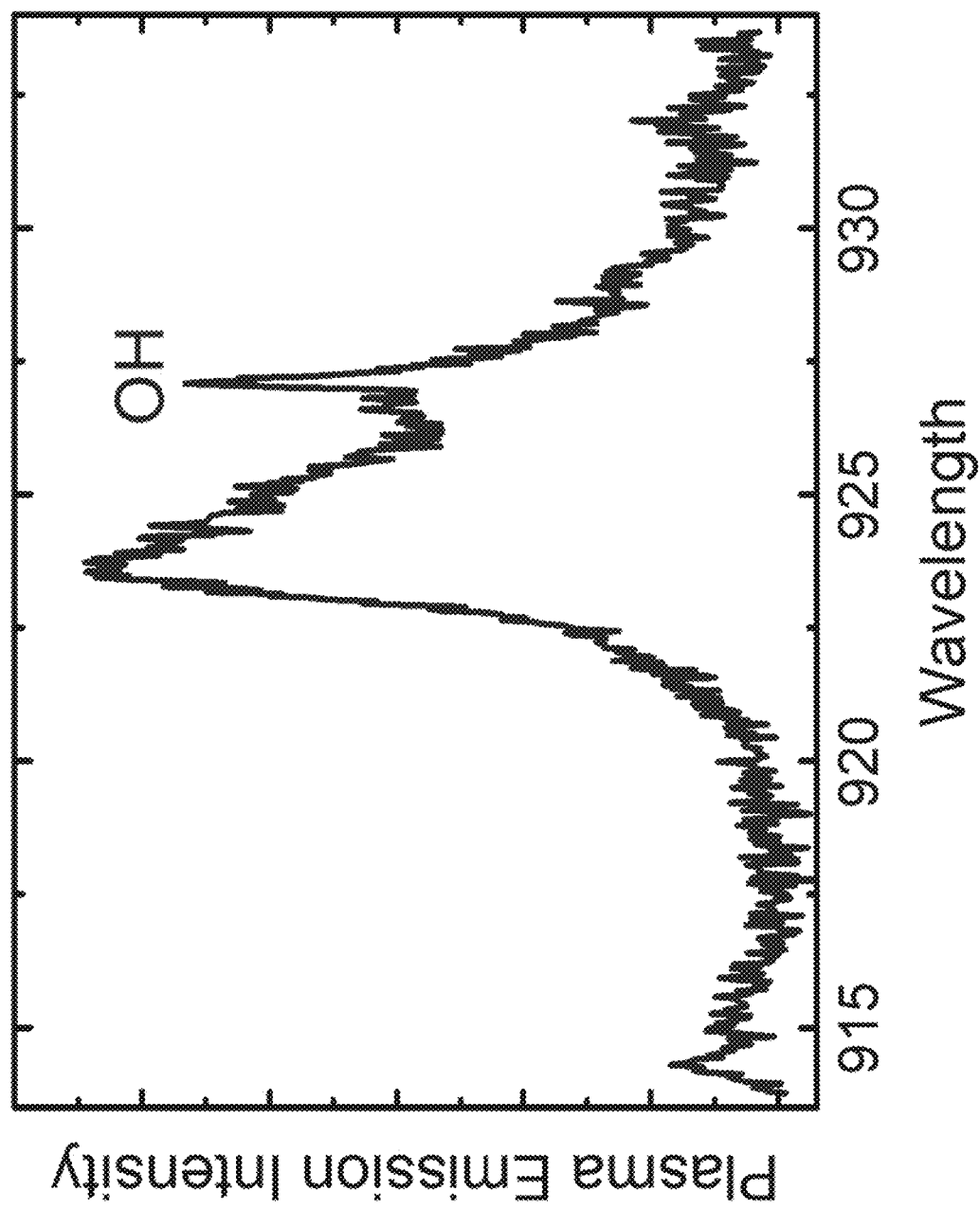
FIG. 10A-FIG. 10B depicts in accordance with various embodiments of the present invention, a plasma emission spectra of OH radicals observed from high voltage discharge in aqueous solution (FIG. 10A), and a SERS-enhanced vibrational spectrum of $SO_2$-plasma exposed Ag nanoparticles (FIG. 10B).
Figure 10B:
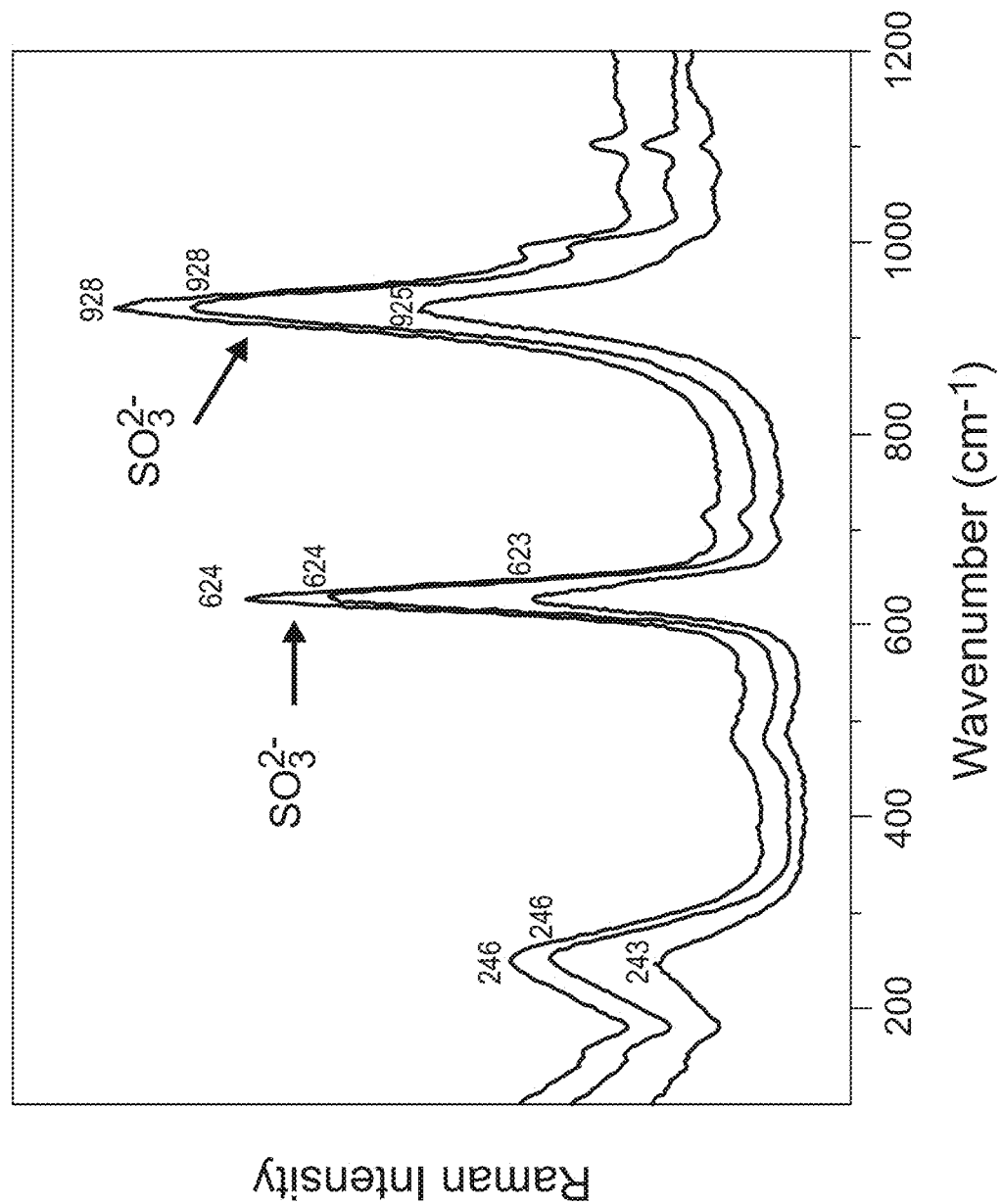
Figure 11A:
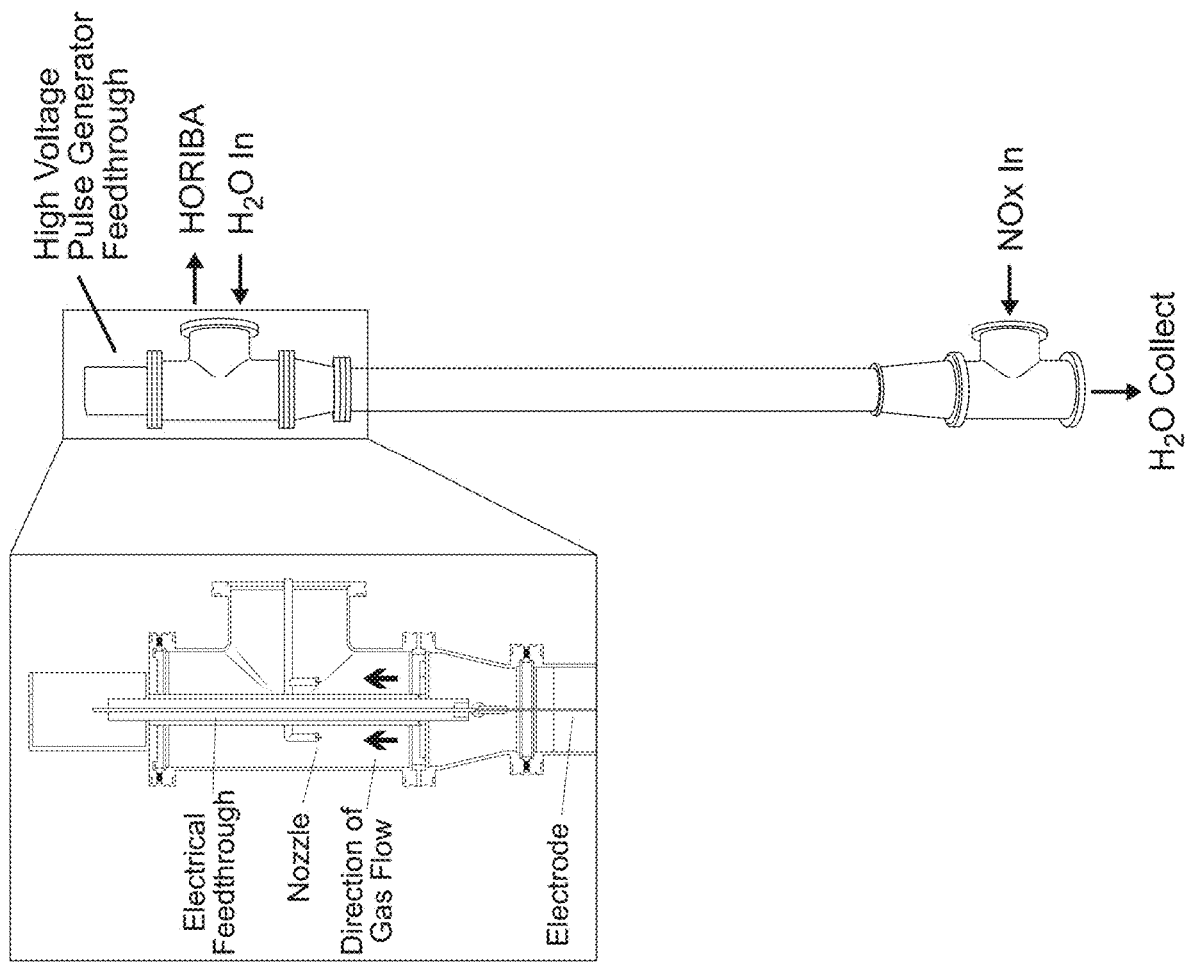
FIG. 11A-FIG. 11C depicts in accordance with various embodiments of the present invention a schematic diagram of the experimental setup used to test the transient pulsed plasma reactor (FIG. 11A), typical output characteristics of nanosecond high voltage pulse generator (FIG. 11B), and a photograph of the transient plasma (hot electron, low-temperature plasma) formed by the high voltage nanosecond pulse approach (FIG. 11C).
Figure 11C:
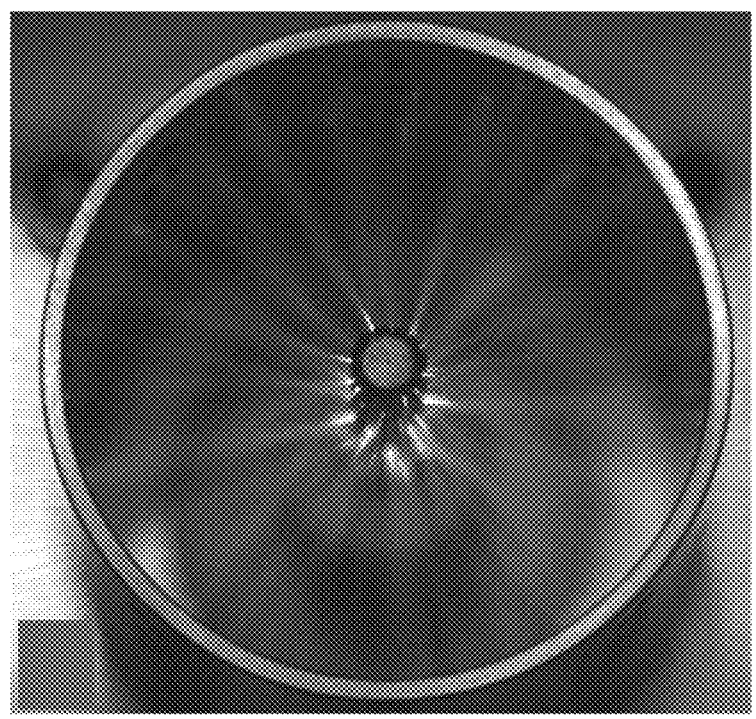
Figure 11B:
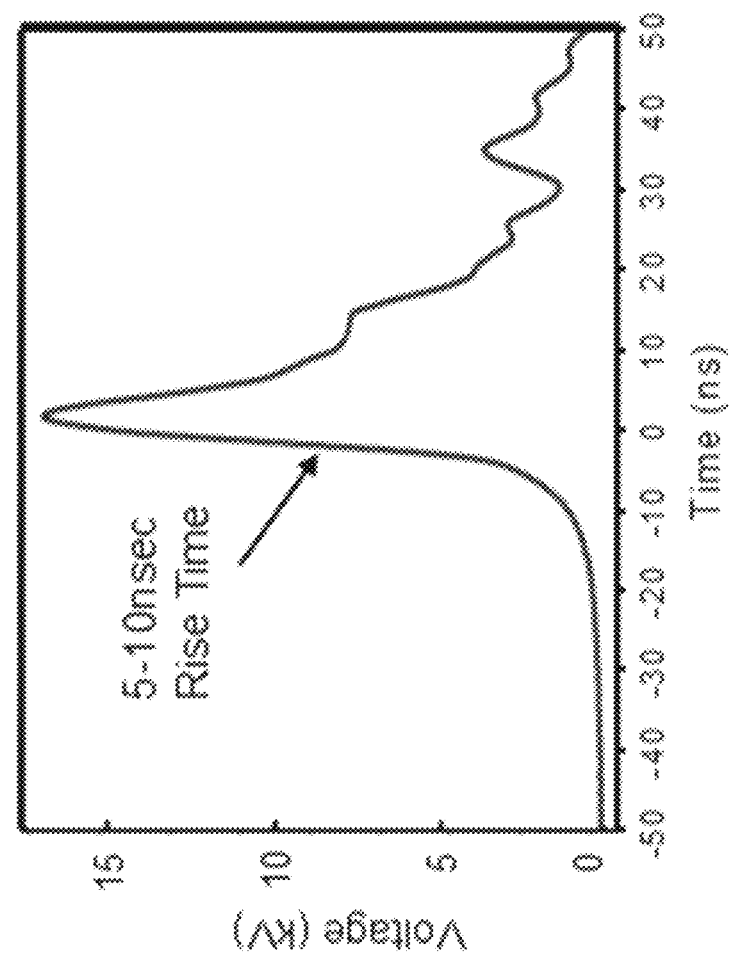
Figure 12B:
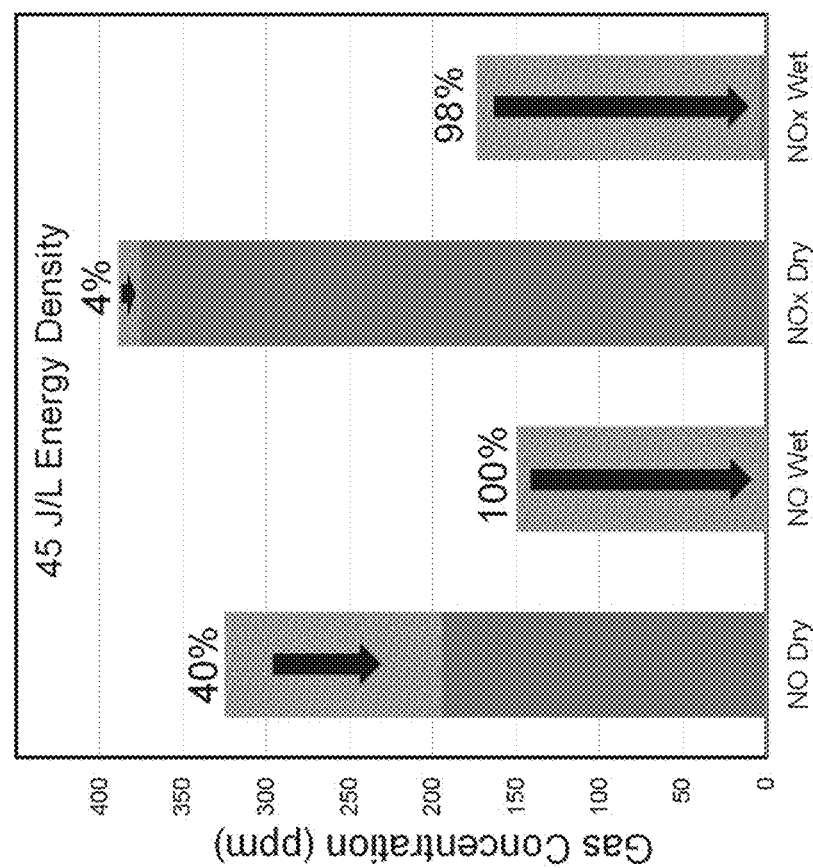
FIG. 12A-FIG. 12B depicts in accordance with various embodiments of the present invention NO and NOx gas concentrations with and without the plasma discharge under both dry" (i.e., without water aerosol) and "wet" (i.e., water aerosol) conditions, low plasma density (FIG. 12A), and high plasma density (FIG. 12B).
Figure 12A:
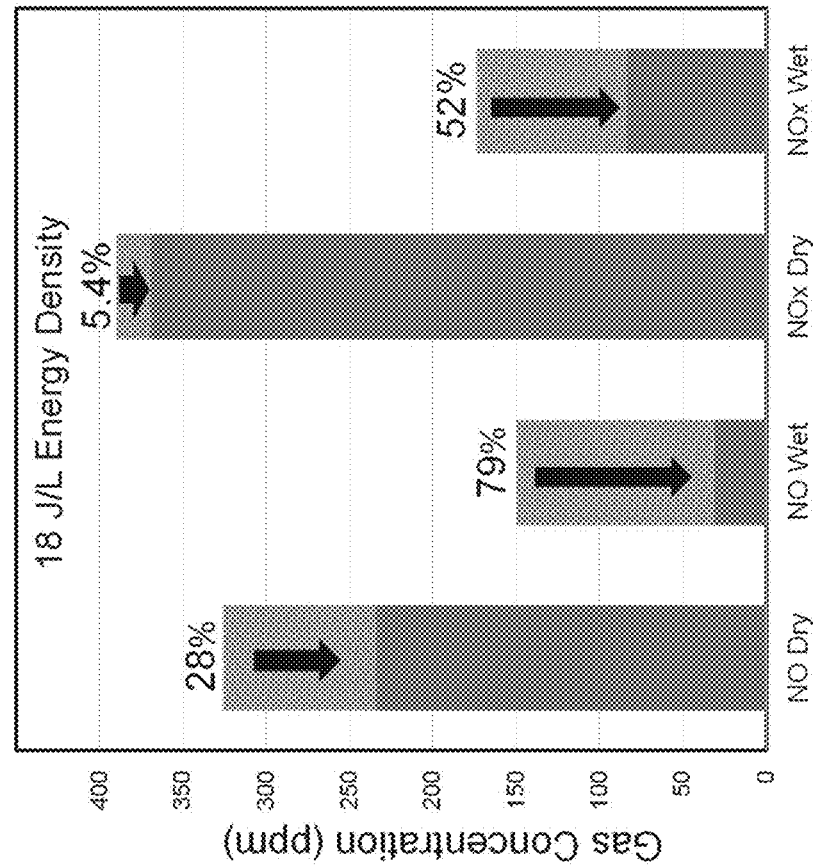
Figure 13A:
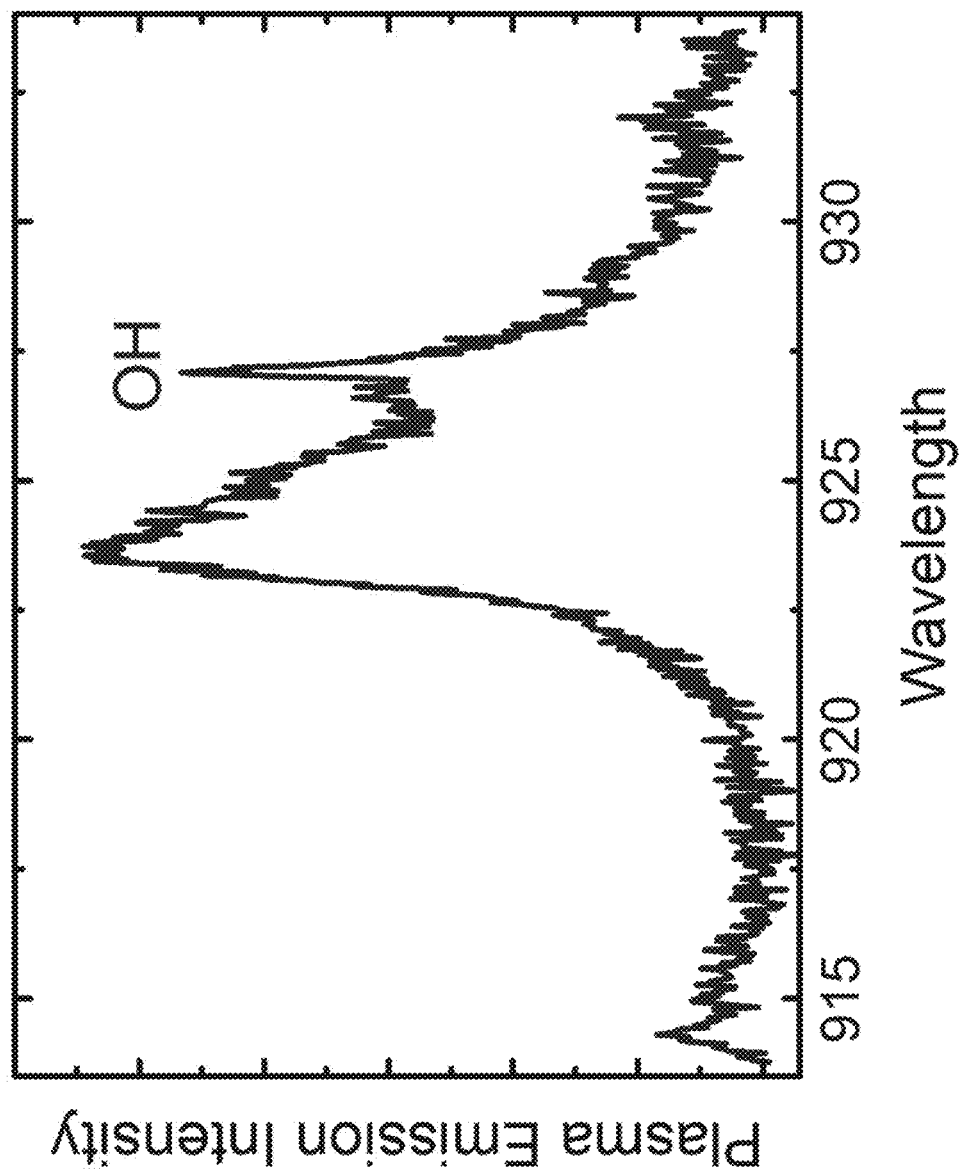
FIG. 13A-FIG. 13C depicts in accordance with various embodiments of the present invention plasma emission spectra of OH radicals (FIG. 13A), atomic oxygen observed from high voltage discharge in aqueous solution (FIG. 13B), and SERS-enhanced spectrum of NO-plasma exposed Ag nanoparticles (FIG. 13C).
Figure 13B:
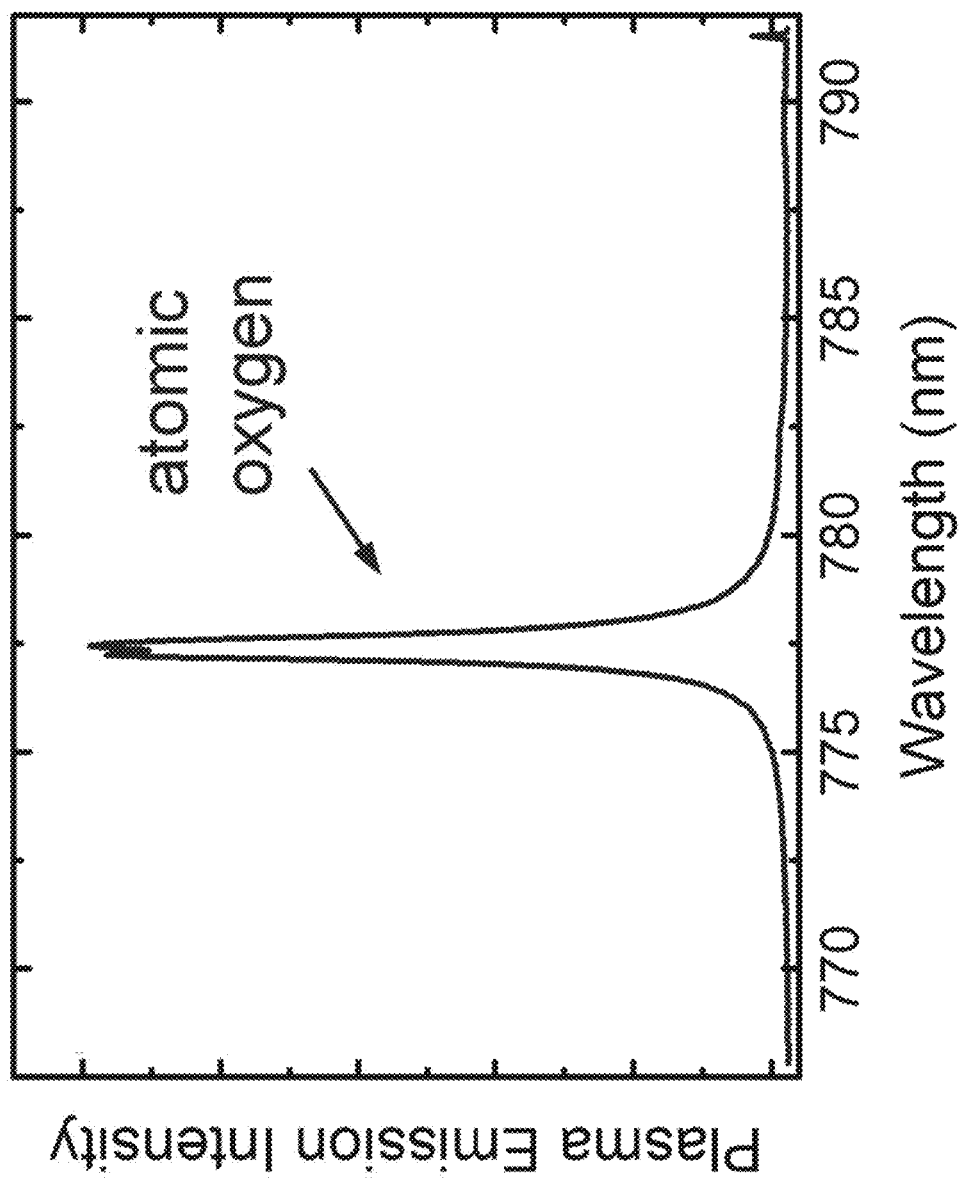
Figure 13C:
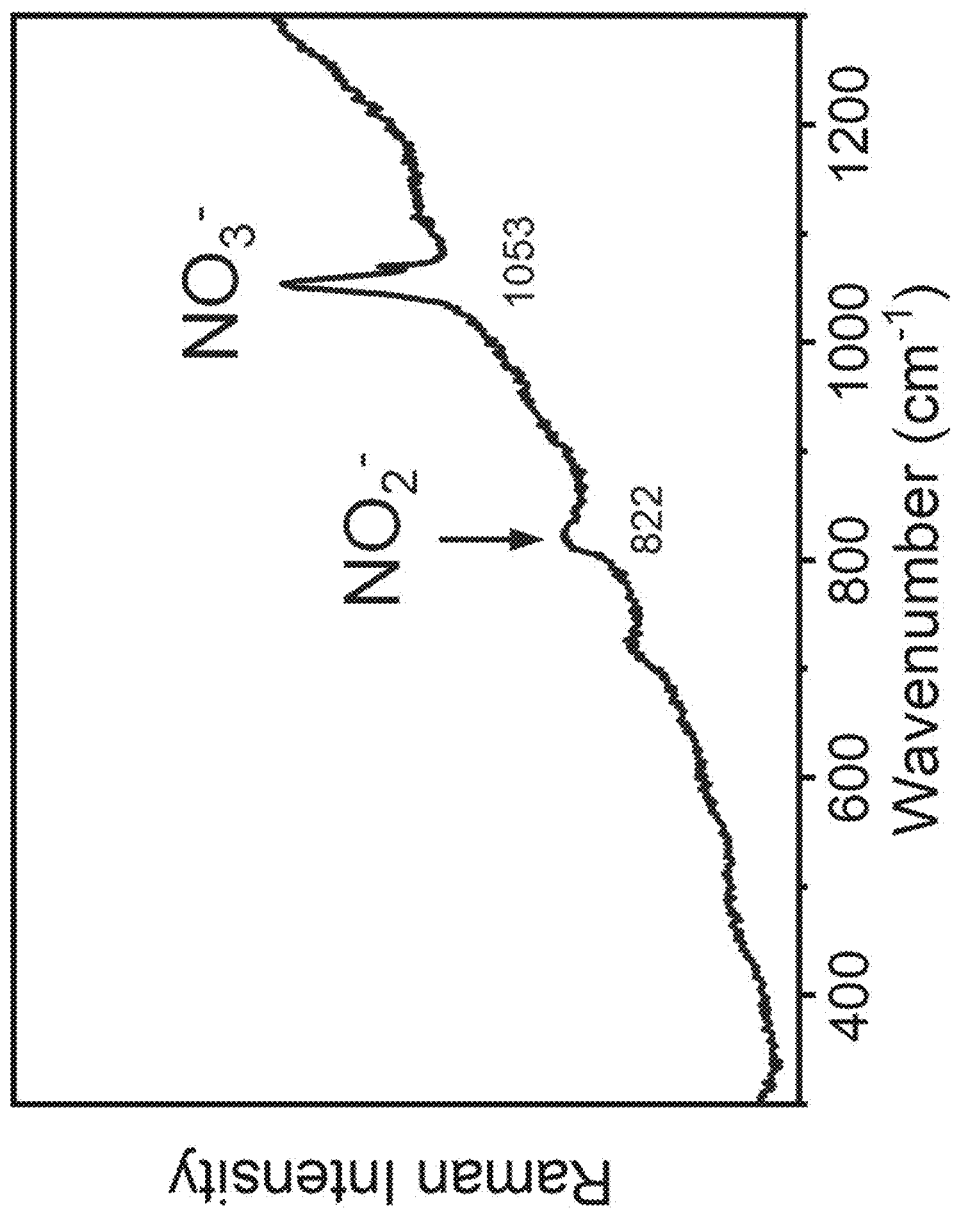
Figure 14:
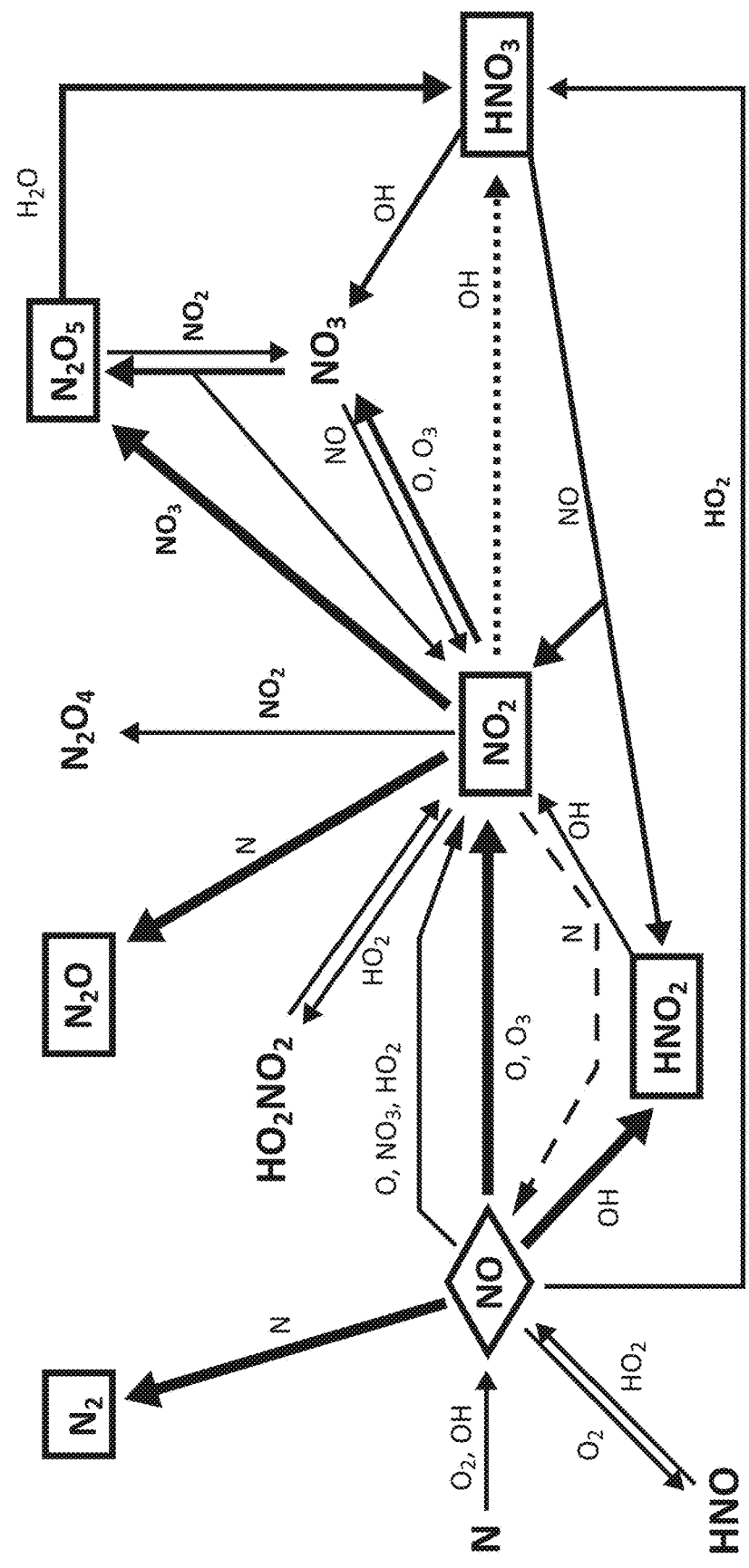
FIG. 14 depicts in accordance with various embodiments of the present invention a schematic showing possible chemical pathways for NOx remediation via plasma-based treatment.
Figure 15:
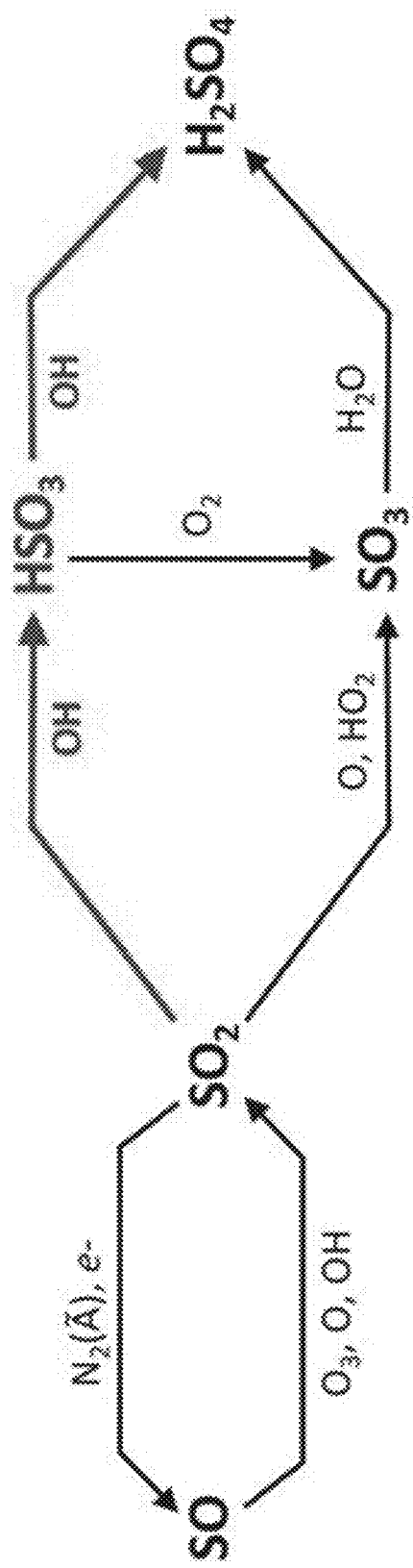
FIG. 15 depicts in accordance with various embodiments of the present invention a schematic showing possible chemical pathways for SOx remediation via plasma-based treatment.
Figure 16:
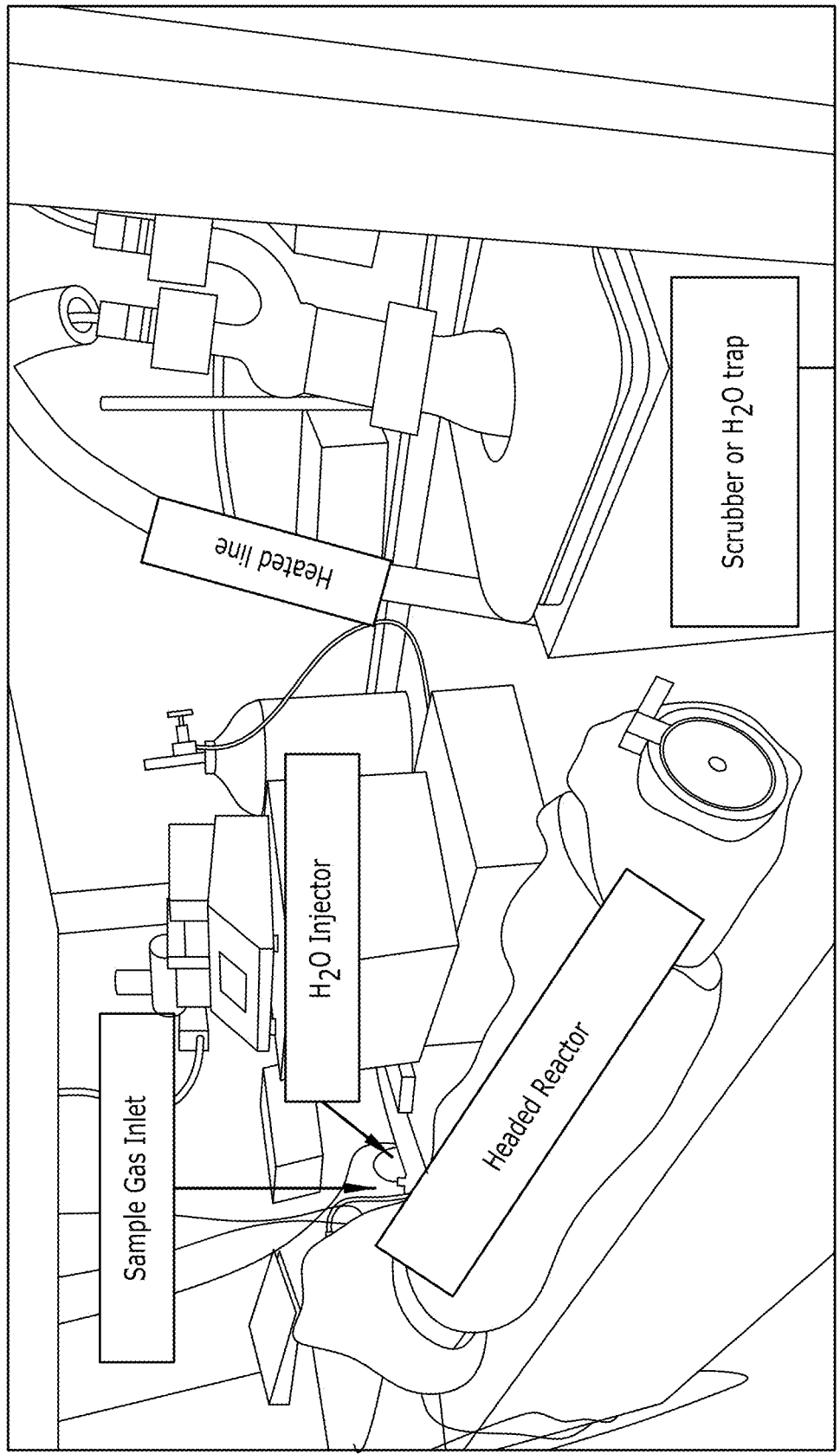
FIG. 16 depicts in accordance with various embodiments of the present invention a photograph of Transient Plasma Emissions Remediation (TPER) and scrubber coupling.
Figure 17A:
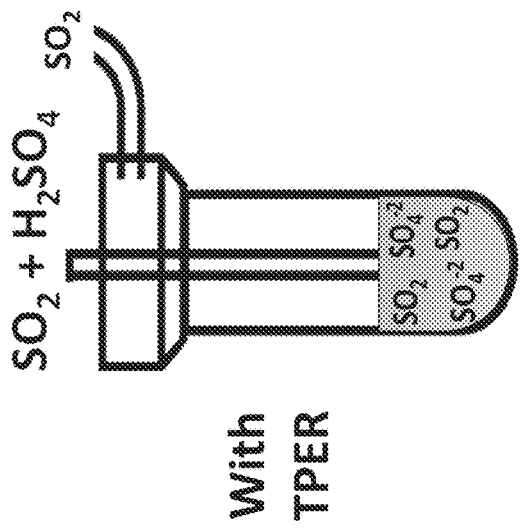
FIG. 17A-FIG. 17C depicts in accordance with various embodiments of the present invention a plasma-enhanced static scrubber apparatus (FIG. 17A), without Transient Plasma Emissions Remediation (TPER) (FIG. 17B), and with Transient Plasma Emissions Remediation (TPER) (FIG. 17C).
Figure 17B:
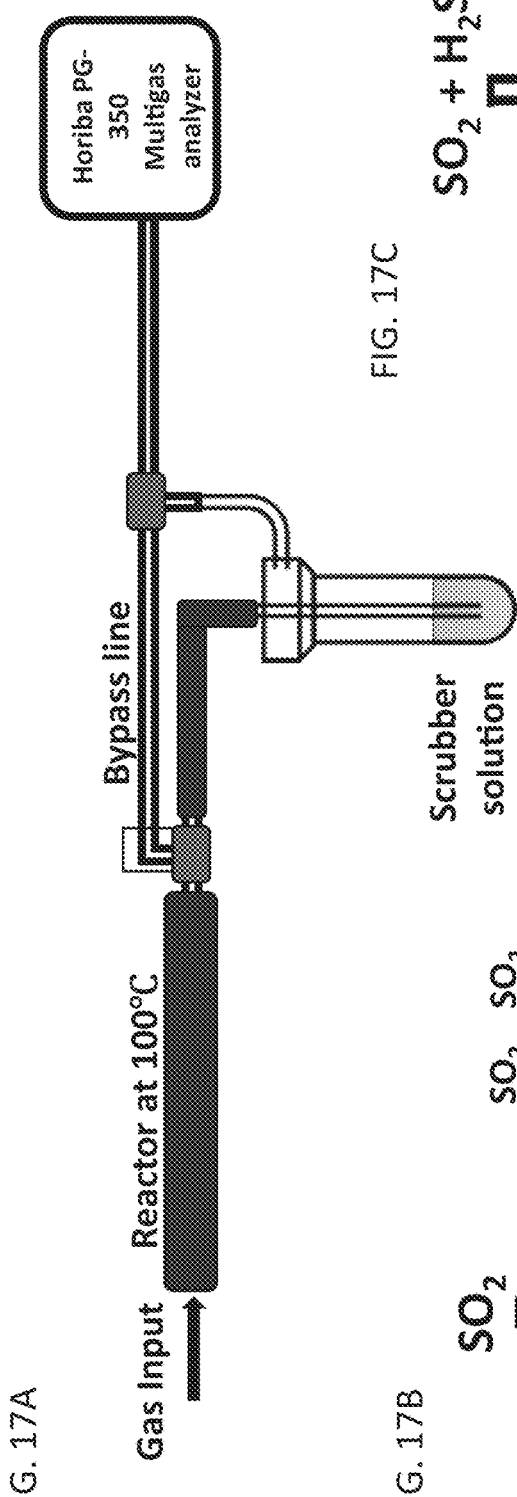
Figure 17C:
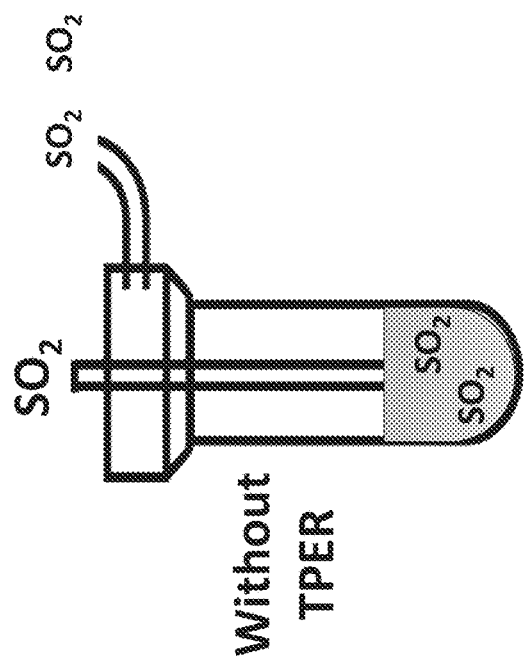

In order to substantiate our hypothesis that OH radicals drive the intermediate steps in this $SO_2$ remediation reaction, we performed in situ plasma emission spectroscopy of our nanosecond pulsed plasma discharge with water, which shows a clear peak around 927 nm, as shown in FIG. 10A This feature is associated with charge neutral OH radicals, which correspond to highly chemically active, short lived species. These radical species produce several oxidizing agents, such as ozone and hydrogen peroxide that can be detected chemically. FIG. 10B shows surface enhanced Raman scattering (SERS)-enhanced vibrational spectra of $H_2O/SO_2$-plasma exposed Ag nanoparticles. Sharp peaks observed around 624 and 928 $cm^{-1}$ are in agreement with $SO_3^{2-}$ species, which correspond to the deprotonated $HSO_3$ reaction intermediate. These spectroscopic signatures provide further evidence of the OH-driven reaction pathway proposed for this water vapor-enhanced, plasma-driven process. This approach circumvents the standard $SO_2(g)/SO_2^0$ (aq) equilibria and overcome the relatively low solubility of $SO_2$ in water, which is several orders of magnitude lower than the solubility of $H_2SO_4$. The $H_2SO_4$ can then be removed in $H_2O$ with nearly unity capture and subsequently titrated, as is typical done in wet scrubbers.

This plasma-enhanced $SO_2$ remediation process may enable ships to burn high sulfur fuels while meeting the IMO SOx 2020 emissions standards. The price of low sulfur bunker fuel ($540 per metric ton) is typically 30-40% more expensive than that of high sulfur bunker fuel ($400 per metric ton). For a typical ship burning 100 tons of fuel per day, this price differential equates to a cost savings of $5M per year, providing a large economic incentive to implement this plasma-based technology.

In conclusion, we report the synergistic effect of discharging nanosecond pulsed plasma in a humidified $SO_2$ gas matrix. Here, a substantial enhancement in the remediation of gaseous $SO_2$ is produced beyond that achieved with the plasma discharge alone (i.e., "dry") or with the water vapor alone (i.e., no plasma). Together, the water vapor-enhanced, plasma-driven process produces a 84% reduction in $SO_2$, whereas the dry, plasma-driven process only produces a 15% reduction in $SO_2$. Here, the main mechanism of $SO_2$ remediation reaction lies in the availability OH radicals, which drives the following reaction processes: $SO_2 + {}^\cdot OH \rightarrow HSO_3$ and $HSO_3 + {}^\cdot OH \rightarrow H_2SO_4$. Spectroscopic evidence of the short-lived, highly reactive OH radical is obtained through plasma emission spectroscopy and SERS-enhanced Raman spectroscopy. The $SO_2$ removal efficacy increases with increasing temperature, reflecting the relatively low barriers of this reaction, and it also increases with plasma density demonstrating the scalability of this approach.

Herein we report nitrogen oxide (i.e., NO and $NO_2$) remediation using a transient pulsed plasma discharge in a water aerosol gas matrix using nanosecond high voltage pulses. In the conversion of NO to $NO_2$ using plasma-driven processes, the total removal of NOx (i.e., NO plus $NO_2$) is severely limited by the back reaction of $NO_2$ to NO, which is also driven by the highly reactive radical species in the plasma (e.g., atomic N). By injecting water aerosol into the gas matrix, we are able to selectively drive a plasma-based reaction which minimizes the back reaction of $NO_2$ to NO. Here, the synergistic effect of the water aerosol and plasma discharge enables enhanced NOx removal by creating OH radicals which, in turn, drive $NO_2$ to $HNO_3$, which is highly soluble in water. The resulting $HNO_3$ is then removed and titrated, as is typically done in a wet scrubber configuration. Under "dry" conditions, we only observe a 4% reduction in total NOx due to the plasma discharge. In the presence of water aerosol, however, the plasma discharge results in a 100% reduction in NO and a 98% reduction in total NOx. Spectroscopic evidence of the short-lived, highly reactive OH radical is obtained through plasma emission spectroscopy and the vibrational signatures of the $NO_2$ and $NO_3^-$ intermediates are observed using SERS-enhanced Raman spectroscopy. We show that the NOx remediation increases with plasma power density demonstrating the scalability of this general approach.

In the combustion of fossil fuels, NO and $NO_2$ are produced as harmful pollutants giving rise to smog and acid rain. Effective NOx (i.e., NO, $NO_2$) remediation remains challenging. The detailed chemical pathways associated with plasma-based remediation process are complex and not fully understood. FIG. 14 illustrates the multitude of the possible chemical pathways in this remediation process. Here, the major products are $NO_2$, $N_2O$, $N_2O_5$, $N_2$, $HNO_2$, $HNO_3$ (indicated in boxes in FIG. 14), and the radicals assisting each reaction include various excited states of O, $O_3$, OH, N, NO, and $HO_2$ (shown next to the corresponding arrow in FIG. 14). The reaction of NO with oxygen radicals are believed to be the dominant reactions for plasma-based remediation. The back reaction of N with $NO_2$ and the reaction of $O_3$ with $NO_2$ both replenish NO. Transient plasmas produced by high voltage nanosecond pulses consume far less energy in the creation of the plasma than conventional RF sources. The transient nature of the plasma necessitates that very little current is drawn in creating the plasma. That is, once the streamer is created, the applied field collapses before a substantial amount of current (and hence electric power) can flow. Because of its transient nature, this is a cold plasma, in which the electron energies are around 30 eV ($T=10^5$K), while the vibrational modes of the molecules remain at room temperature. These "hot" electrons enable new chemical pathways to be explored in the formation of energetic intermediate species that are otherwise not possible to make through standard equilibrium chemistry. The NO removal efficiency of nanosecond pulse discharges can be as high as 0.75 mol/kWh, which is considerably higher than that obtained with (microsecond) pulsed corona discharges (0.35 mol/kWh) and dielectric barrier discharge (DBD) reactors (0.2 mol/kWh).

NO is significantly less soluble in water than both $SO_2$ and $CO_2$. However, we have shown that plasma treatment can convert NO to $NO_2$ extremely efficiently. In the work presented here, we demonstrate a synergistic effect of injecting water aerosol with plasma discharge to push this reaction to $HNO_3$ via the creation of OH radicals. Here, we perform a comparative study of plasma discharge with (i.e., "wet") and without (i.e., "dry") injection of water aerosol, systematically at different plasma densities. Plasma emission spectra and Raman scattering spectra are taken in order to verify the OH and $NO_3$ intermediates.

In the work presented herein, a transient plasma is created using a nanosecond pulse discharge in a coaxial reactor consisting of a 3 ft-long, 2 inch-diameter stainless steel cylindrical anode with a single-wire cathode center electrode, as depicted in FIG. 11A. A Transient Plasma Systems Model 20X pulse generator is operated with a peak output voltage of 17 kV (FIG. 11B) at pulse repetition rates up to 2 kHz and continuous powers up to 0.8 kW. FIG. 11B shows a plot of a typical pulse waveform generated using this system. The recent availability of solid-state nanosecond high voltage pulse generators, which consume less energy than conventional RF plasmas, opens up the possibly of driving these NOx remediation processes more efficiently. At a peak voltage 17 kV, this system delivers a transient power of 4.76 MW. FIG. 11A illustrates the reactor configuration in which a water aerosol (i.e., approximately 100 nm diameter nanoparticles) is injected into the reactor using an ultrasonic nozzle in the direction counter to the flow of NOx to be treated. At the output of this reactor, NO and NOx concentrations are measured using a portable gas analyzer (Horiba Model PGA-350), which samples at a flow rate of 0.5 L/min. In the experiments reported here, our synthetic gas mixture was prepared by mixing neat NO gas with compressed dried air at 500 PPM by volume.

FIG. 12A shows a plot of the NO and NOx concentrations taken with ("wet") and without ("dry") water aerosol injection. FIG. 12A and FIG. 12B show the results obtained at plasma densities of 18 J/L and 45 J/L, respectively. Here, we observe relatively little plasma-induced remediation in the dry gas mixtures: 40% for ΔNO and only 4% for ΔNOx. However, a dramatic increase in NO and NOx remediation is observed the presence of water aerosol injection: 100% for ΔNO and 98% for ΔNOx. This marked improvement in remediation efficacy demonstrates the synergistic effects of adding water together with plasma discharge, which increases the availably of OH radicals far beyond that attained with the plasma alone or the water aerosol alone. This plasma-enhanced remediation mechanism is comprised of a two-step process, in which the NO is converted to $NO_2$ by atomic oxygen radicals in the plasma followed by the rapid conversion of $NO_2$ to $HNO_3$ via the OH radicals created by discharging the plasma in the presence of water aerosol. This second step minimizes the back reaction of $NO_2$ to NO, greatly improving the efficacy of this approach. The resulting $HNO_3$ is highly soluble in the water aerosol matrix is captured with near unity efficiencies and subsequently titrated.

In order to corroborate the hypothesis that OH radicals drive the $NO_2 \rightarrow HNO_3$ step in this NOx remediation process, in situ plasma emission spectroscopy was performed using nanosecond pulsed plasma discharge with water, as shown in FIG. 13A. Here, a sharp peak is observed at a wavelength around 927 nm, which corresponds to charge neutral OH radicals that are short lived, highly chemically active species. These OH radical species are known to produce various oxidizing agents, such as hydrogen peroxide and ozone. Here, however, we believe the OH radicals are used directly to drive $NO_2$ to $HNO_3$, as described above. FIG. 13B shows a plasma emission spectrum centered around 777 nm, which corresponds to light originating from atomic oxygen species, responsible for the first step in this remediation process (i.e., $NO \rightarrow NO_2$). FIG. 13C shows surface enhanced Raman scattering (SERS)-enhanced vibrational spectra of $H_2O/NO_2$ plasma exposed Ag nanoparticles. Sharp peaks observed around 822 and 1053 cm$^{-1}$ are in agreement with previous reports of $NO_2^-$ and $NO_3^-$ species, which correspond to the deprotonated $HNO_3$ reaction intermediate. These spectroscopic signatures provide further evidence of the OH-driven reaction pathway proposed for this water aerosol-enhanced, plasma-driven process. This approach circumvents the standard $NO(g)/HNO_3^0$ (aq) equilibria and overcomes the relatively low solubility of NO in water, which is several orders of magnitude lower than the solubility of $HNO_3$. The $HNO_3$ is then removed in $H_2O$ with nearly unity capture and subsequently titrated, as is typical done in a wet scrubber configuration.

In conclusion, we demonstrate a synergistic effect in the remediation of toxic nitrogen oxide pollutants (i.e., NO and $NO_2$) by discharging a nanosecond pulsed transient plasma discharge together with injection of a water aerosol into the gas matrix. Previous studies have shown high efficiency conversion of NO to $NO_2$ via plasma-based processes but poor removal of total NOx (i.e., NO and $NO_2$) due to the rapid back reaction of $NO_2$ back to NO. By comparing the plasma-based remediation with and without injection of water aerosol, we are able to isolate a reaction pathway that minimizes the back reaction of $NO_2$ to NO by increasing the availability of OH radicals. This results in a two-step process, whereby NO is first converted to $NO_2$ by atomic oxygen radicals, and then $NO_2$ is subsequently converted to $HNO_3$ via OH radicals. Here, the key reactants OH and O are evidenced by plasma emission spectroscopy, while the vibrational signatures of the $HNO_3^-$ intermediate species are observed using SERS spectroscopy. Using this synergistic approach, we observe a 98% reduction in NO and a 100% reduction in total NOx due to the plasma discharge in the presence of water aerosol. Without the plasma discharge, the NOx removal efficiency is generally limited by the low solubility of NO and $NO_2$ in water. Here, we provide a way around this limitation by rapidly driving $NO_2$ to $HNO_3$, before it can be converted by the back reaction to NO.

In various embodiments, the present invention provides a system for plasma-based remediation, comprising: a flow reactor, wherein the flow reactor comprises an internal chamber and an electrode at least partially disposed within the internal chamber, the internal chamber being configured to be fluidly coupled to a gas source such that a gas from the gas source flows into the internal chamber of the flow reactor, wherein the gas comprises a concentration of a first chemical compound, wherein the first chemical compound is selected from the group consisting of NOx, SOx, and combinations thereof, a pulse generator electrically coupled to the electrode of the flow reactor, the pulse generator being configured to deliver electrical pulses to the electrode to thereby form a plasma from the gas, the first chemical compound being converted to a second chemical compound in the plasma; and a water source fluidly coupled to the internal chamber of the flow reactor, the water source being configured to inject water into the internal chamber of the flow reactor to form ˙OH (hydroxyl radical) molecules from at least a first portion of the injected water when the electrical pulses are delivered to the electrode, the ˙OH molecules reacting with the second chemical compound in the plasma so as to convert the second chemical compound into a water soluble chemical compound, and at least a second portion of the injected water removing the water soluble chemical compound from the flow reactor, thereby reducing the concentration of the first chemical compound in the gas. In some embodiments, the electrode is selected from the group consisting of a three-wire electrode, a four-wire electrode, and an extruded electrode. In some embodiments, the extruded electrode includes a central portion and at least one arm extending from the central portion. In some embodiments, the plasma is a non-thermal plasma. In some embodiments, NOx is NO. In some embodiments, the second chemical compound is $NO_2$. In some embodiments, the water soluble chemical compound is $HNO_3$. In some embodiments, SOx is $SO_2$. In some embodiments, the second chemical compound is $HSO_3$. In some embodiments, the water soluble chemical compound is $H_2SO_4$. In some embodiments, the pulse generator is a solid-state nanosecond high voltage pulse generator. In some embodiments, the gas is an exhaust gas. In some embodiments, the gas source is an engine. In some embodiments, the engine is a combustion engine. In some embodiments, the engine is a diesel engine. In some embodiments, the electrical pulses are high voltage nanosecond electrical pulses. In some embodiments, the electrical pulses have a repetition rate of up to 2000 Hz. In some embodiments, the water is water aerosol. In some embodiments, the water is water vapor. In some embodiments, at least a portion of the flow reactor can be heated, cooled, or both. In some embodiments, the first chemical compound is converted to a second chemical compound in the plasma by the ˙OH molecules reacting with the first chemical compound in the plasma so as to convert the first chemical compound to the second chemical compound.

In various embodiments, the present invention provides a system for plasma-based remediation, comprising: a flow reactor, wherein the flow reactor comprises an internal chamber and an electrode at least partially disposed within the internal chamber, the internal chamber being configured to be fluidly coupled to a gas source such that a gas from the gas source flows into the internal chamber of the flow reactor, wherein the gas comprises a concentration of a first chemical compound, wherein the first chemical compound is selected from the group consisting of NOx, SOx, and combinations thereof, a pulse generator electrically coupled to the electrode of the flow reactor, the pulse generator being configured to deliver electrical pulses to the electrode to thereby form a plasma from the gas; and a water source fluidly coupled to the internal chamber of the flow reactor, the water source being configured to inject water into the internal chamber of the flow reactor to form ˙OH (hydroxyl radical) molecules from at least a first portion of the injected water when the electrical pulses are delivered to the electrode, the ˙OH molecules reacting with the first chemical compound in the plasma so as to convert the first chemical compound into a water soluble chemical compound, and at least a second portion of the injected water removing the water soluble chemical compound from the flow reactor, thereby reducing the concentration of the first chemical compound in the gas. In some embodiments, the electrode is selected from the group consisting of a three-wire electrode, a four-wire electrode, and an extruded electrode. In some embodiments, the extruded electrode includes a central portion and at least one arm extending from the central portion. In some embodiments, the plasma is a non-thermal plasma. In some embodiments, NOx is NO. In some embodiments, the water soluble chemical compound is $HNO_3$. In some embodiments, SOx is $SO_2$. In some embodiments, the water soluble chemical compound is $H_2SO_4$. In some embodiments, the pulse generator is a solid-state nanosecond high voltage pulse generator. In some embodiments, the gas is an exhaust gas. In some embodiments, the gas source is an engine. In some embodiments, the engine is a combustion engine. In some embodiments, the engine is a diesel engine. In some embodiments, the electrical pulses are high voltage nanosecond electrical pulses. In some embodiments, the electrical pulses have a repetition rate of up to 2000 Hz. In some embodiments, the water is water aerosol. In some embodiments, the water is water vapor. In some embodiments, at least a portion of the flow reactor can be heated, cooled, or both.

In various embodiments, the present invention provides a method for plasma-based remediation, comprising: receiving a gas from a gas source into an internal chamber of a flow reactor, wherein the gas comprises a concentration of a first chemical compound, wherein the first chemical compound is selected from the group consisting of NOx, SOx, and combinations thereof; delivering electric pulses to an electrode positioned in the internal chamber such that a plasma is formed from the gas, wherein the first chemical compound is converted to a second chemical compound in the plasma; injecting water into the internal chamber of the flow reactor in the presence of the plasma, wherein ˙OH (hydroxyl radical) molecules are formed from at least a first portion of the injected water when the electrical pulses are delivered to the electrode, and wherein the ˙OH molecules react with the second chemical compound so as to convert the second chemical compound into a water soluble chemical compound; and removing at least a second portion of the injected water from the flow reactor, wherein the second portion of the injected water comprises the water soluble compound, thereby reducing the concentration of the first chemical compound in the gas. In some embodiments, the electrode is selected from the group consisting of a three-wire electrode, a four-wire electrode, and an extruded electrode. In some embodiments, the extruded electrode includes a central portion and at least one arm extending from the central portion. In some embodiments, the plasma is a non-thermal plasma. In some embodiments, NOx is NO. In some embodiments, the second chemical compound is $NO_2$. In some embodiments, the water soluble chemical compound is $HNO_3$. In some embodiments, SOx is $SO_2$. In some embodiments, the second chemical compound is $HSO_3$. In some embodiments, the water soluble chemical compound is $H_2SO_4$. In some embodiments, the electric pulses are delivered by a pulse generator. In some embodiments, the pulse generator is a solid-state nanosecond high voltage pulse generator. In some embodiments, the gas is an exhaust gas. In some embodiments, the gas source is an engine. In some embodiments, the engine is a combustion engine. In some embodiments, the engine is a diesel engine. In some embodiments, the electrical pulses are high voltage nanosecond electrical pulses. In some embodiments, the electrical pulses have a repetition rate of up to 2000 Hz. In some embodiments, the water is water aerosol. In some embodiments, the water is water vapor. In some embodiments, at least a portion of the flow reactor can be heated, cooled, or both. In some embodiments, the first chemical compound is converted to a second chemical compound in the plasma by the ˙OH molecules reacting with the first chemical compound in the plasma so as to convert the first chemical compound to the second chemical compound.

In various embodiments, the present invention provides a method for plasma-based remediation, comprising: receiving a gas from a gas source into an internal chamber of a flow reactor, wherein the gas comprises a concentration of a first chemical compound, wherein the first chemical compound is selected from the group consisting of NOx, SOx, and combinations thereof; delivering electric pulses to an electrode positioned in the internal chamber such that a plasma is formed from the gas; injecting water into the internal chamber of the flow reactor in the presence of the plasma, wherein ˙OH (hydroxyl radical) molecules are formed from at least a first portion of the injected water when the electrical pulses are delivered to the electrode, and wherein the ˙OH molecules react with the first chemical compound so as to convert the first chemical compound into a water soluble chemical compound; and removing at least a second portion of the injected water from the flow reactor, wherein the second portion of the injected water comprises the water soluble compound, thereby reducing the concentration of the first chemical compound in the gas. In some embodiments, the electrode is selected from the group consisting of a three-wire electrode, a four-wire electrode, and an extruded electrode. In some embodiments, the extruded electrode includes a central portion and at least one arm extending from the central portion. In some embodiments, the plasma is a non-thermal plasma. In some embodiments, NOx is NO. In some embodiments, the water soluble chemical compound is $HNO_3$. In some embodiments, SOx is $SO_2$. In some embodiments, the water soluble chemical compound is $H_2SO_4$. In some embodiments, the electric pulses are delivered by a pulse generator. In some embodiments, the pulse generator is a solid-state nanosecond high voltage pulse generator. In some embodiments, the gas is an exhaust gas. In some embodiments, the gas source is an engine. In some embodiments, the engine is a combustion engine. In some embodiments, the engine is a diesel engine. In some embodiments, the electrical pulses are high voltage nanosecond electrical pulses. In some embodiments, the electrical pulses have a repetition rate of up to 2000 Hz. In some embodiments, the water is water aerosol. In some embodiments, the water is water vapor. In some embodiments, at least a portion of the flow reactor can be heated, cooled, or both.

In various embodiments, the present invention provides a plasma reactor for plasma-based remediation, comprising: a flow reactor comprising an internal chamber; a gas input port coupled to the flow reactor, the gas input port being configured to fluidly couple a gas source to the flow reactor such that a gas can flow into the internal chamber of the flow reactor; an electrode at least partially disposed within the internal chamber of the flow reactor; a pulse generator electrically coupled to the electrode, the pulse generator being configured to deliver electrical pulses to the electrode to thereby form a plasma from the gas; a water inlet port coupled to the flow reactor, the water inlet port being configured to fluidly couple a water source to the internal chamber of the flow reactor, the water source being configured to inject water into the internal chamber of the flow reactor in the presence of the plasma; a gas outlet port coupled to the flow reactor, the gas outlet port being configured to remove the gas from the internal chamber of the flow reactor; and a water output port coupled to the flow reactor, the water output port being configured to remove the water from the internal chamber of the flow reactor. In some embodiments, the electrode is selected from the group consisting of a three-wire electrode, a four-wire electrode, and an extruded electrode. In some embodiments, the extruded electrode includes a central portion and at least one arm extending from the central portion. In some embodiments, the plasma is a non-thermal plasma. In some embodiments, the pulse generator is a solid-state nanosecond high voltage pulse generator. In some embodiments, the gas is an exhaust gas. In some embodiments, the gas source is an engine. In some embodiments, the engine is a combustion engine. In some embodiments, the engine is a diesel engine. In some embodiments, the electrical pulses are high voltage nanosecond electrical pulses. In some embodiments, the electrical pulses have a repetition rate of up to 2000 Hz. In some embodiments, the water is water aerosol. In some embodiments, the water is water vapor. In some embodiments, at least a portion of the flow reactor can be heated, cooled, or both.

In various embodiments, the second portion of the injected water removes the $H_2SO_4$ molecules with near unity capture. In various embodiments, the water source includes a nozzle configured to aerosolize the water such that the water is injected into the plasma in the internal chamber of the flow reactor as water droplets. In various embodiments, the exhaust gas is configured to flow through the flow reactor in a first direction, and wherein the water source is configured to inject the water into the flow reactor in a second direction. In various embodiments, the second direction is parallel and opposed to the first direction. In various embodiments, at least a first portion of the $^\bullet$OH molecule reacts with the $SO_2$ molecules to form $HSO_3$ molecules, and wherein at least a second portion of the $^\bullet$OH molecules reacts with the $HSO_3$ molecules to form $H_2SO_4$ molecules. In various embodiments, the electrode is a center wire cathode electrode. In various embodiments, the pulse generator has a peak voltage of between about 33 kilovolts and about 40 kilovolts, a pulse rise time of between about 7 nanoseconds and about 17 nanoseconds, a full width half maximum (FWHM) of between about 10 nanoseconds and about 30 nanoseconds, a maximum energy per pulse of between about 66 millijoules and about 88 millijoules, and a maximum repetition rate of between about 299 Hz and about 800 Hz. In various embodiments, the pulse generator is a high voltage nanosecond pulse generator. In various embodiments, the engine is a diesel engine.

In various embodiments, the second portion of the injected water removes the $H_2SO_4$ molecules with near unity capture. In various embodiments, aerosolizing the water such that the water is injected into the plasma in the internal chamber of the flow reactor as water droplets. In various embodiments, the exhaust gas flows through the flow reactor in a first direction, and wherein the water is injected into the flow reactor in a second direction. In various embodiments, the second direction is parallel and opposed to the first direction. In various embodiments, at least a first portion of the $^\bullet$OH molecules reacts with the $SO_2$ molecules to form $HSO_3$ molecules, and wherein at least a second portion of the $^\bullet$OH molecules reacts with the $HSO_3$ molecules to form $H_2SO_4$ molecules. In various embodiments, the electrode is a center wire cathode electrode. In various embodiments, the pulse generator has a peak voltage of between about 33 kilovolts and about 40 kilovolts, a pulse rise time of between about 7 nanoseconds and about 17 nanoseconds, a full width half maximum (FWHM) of between about 10 nanoseconds and about 30 nanoseconds, a maximum energy per pulse of between about 66 millijoules and about 88 millijoules, and a maximum repetition rate of between about 299 Hz and about 800 Hz. In various embodiments, the pulse generator is a high voltage nanosecond pulse generator. In various embodiments, the engine is a diesel engine. In some embodiments, the engine is a marine diesel engine.

In various embodiments, the electrode is selected from a group comprising an extruded electrode, a 3-wire electrode, and a 4-wire electrode. In various embodiments, the extruded electrode has a cross-section that is selected from a group comprising about 2.0 inches, about 2.25 inches, or about 2.5 inches. In various embodiments, the extrude electrode has a cross-section of between about 1.0 inches and about 5.0 inches. In various embodiments, the electrode is a 3-wire electrode with a cross-section of about 2 inches.

In various embodiments, the extruded electrode includes a central portion and one or more arms extending from the central portion.

In various embodiments, the present invention provides a method for reducing the concentration of SOx in a gas stream, comprising: contacting a gas stream with electrical pulses in the presence of water to form a plasma and acidified water, wherein the gas stream comprises a concentration of SOx; and passing the gas stream through the acidified water to reduce the concentration of SOx in the gas stream. In some embodiments, the SOx is $SO_2$.

In various embodiments, the present invention provides a method for reducing the concentration of $SO_2$ in a gas stream, comprising: contacting a gas stream with electrical pulses in the presence of water to form a plasma and acidified water, wherein the gas stream comprises a concentration of $SO_2$; and passing the gas stream through the acidified water to reduce the concentration of $SO_2$ in the gas stream. In some embodiments, the acidified water comprises $H_2SO_4$.

In various embodiments, the present invention provides a method for reducing the concentration of NOx in a gas stream, comprising: contacting a gas stream with electrical pulses in the presence of water to form a plasma and acidified water, wherein the gas stream comprises a concentration of NOx; and passing the gas stream through the acidified water to reduce the concentration of NOx in the gas stream. In some embodiments, the NOx is NO.

In various embodiments, the present invention provides a method for reducing the concentration of NO in a gas stream, comprising: contacting a gas stream with electrical pulses in the presence of water to form a plasma and acidified water, wherein the gas stream comprises a concentration of NO; and passing the gas stream through the acidified water to reduce the concentration of NO in the gas stream. In some embodiments, the acidified water comprises $HNO_3$.

In some embodiments, the plasma is a non-thermal plasma. In some embodiments, the non-thermal plasma is a transient non-thermal plasma. In some embodiments, the electrical pulses are generated by a nanosecond high voltage pulse generator. In some embodiments, the gas stream is an exhaust gas stream. In some embodiments, the exhaust gas stream is from combustion of a fuel. In some embodiments, the fuel is selected from natural gas, gasoline, petrol, biodiesel blends, diesel fuel, fuel oil, and coal. In some embodiments, the exhaust gas is from combustion of a fuel.

In some embodiments, $HSO_3$ is $HSO_3^-$. In some embodiments, OH radical is $^\bullet$OH.

In various embodiments, the present invention provides a system for SOx and/or NOx remediation, comprising: a flow reactor comprising an internal chamber; a gas input port coupled to the flow reactor, the gas input port being configured to fluidly couple a gas source to the flow reactor such that a gas can flow into the internal chamber of the flow reactor; an electrode at least partially disposed within the internal chamber of the flow reactor; a pulse generator electrically coupled to the electrode; a water inlet port coupled to the flow reactor, the water inlet port being configured to fluidly couple a water source to the internal chamber of the flow reactor, the water source being configured to inject water into the internal chamber of the flow reactor; a gas outlet port coupled to the flow reactor, the gas outlet port being configured to remove the gas from the internal chamber of the flow reactor; and a water output port coupled to the flow reactor, the water output port being configured to remove the water from the internal chamber of the flow reactor.

In some embodiments, the pulse generator is configured to deliver electrical pulses to the electrode to thereby form a plasma from the gas (e.g., the input gas). In some embodiments, the pulse generator is not powered on, and as such no plasma is formed from the gas (e.g., the input gas). In some embodiments, the water is injected into the internal chamber of the flow reactor in the presence of the plasma. In some embodiments, the water is injected into the internal chamber of the flow reactor in the absence of the plasma. In some embodiments, the system is a dynamic scrubber. In some embodiments, the system is a wet reactor. In some embodiments, the gas comprises a concentration of NOx, and/or a concentration of SOx. In some embodiments, the gas being removed from the internal chamber of the flow reactor by way of the gas outlet port has a reduced concentration of SOx and/or a reduced concentration of NOx compared to the concentration of SOx and/or concentration of NOx entering into or flowing into the internal chamber of the flow reactor by way of the gas input port. In some embodiments, the water being removed from the internal chamber of the flow reactor comprises $HNO_3$, $H_2SO_4$, or both. In some embodiments, the water being removed from the internal chamber of the flow reactor is acidified water. In some embodiments, when the pulse generator is not powered on, and as such no plasma is formed from the input gas, the system is a dynamic scrubber. In some embodiments, when the pulse generator is powered on, and as such a plasma is formed from the input gas the system is a wet reactor. In some embodiments, the water added to the internal chamber of the flow reactor is input water or inlet water. In some embodiments, the water removed from the internal chamber of the flow reactor is output water or outlet water. In some embodiments, the gas added to the internal chamber of the flow reactor is input gas or inlet gas. In some embodiments, the gas removed from the internal chamber of the flow reactor is output gas or outlet gas.

In some embodiments, the flow reactor is a plasma reactor. In some embodiments, the flow reactor is a transient pulsed plasma reactor. In some embodiments, the flow reactor is a transient plasma reactor. In some embodiments, the flow reactor is a plasma-based flow reactor.

In some embodiments, the plasma reactor is a flow reactor. In some embodiments, the plasma reactor is a transient pulsed plasma reactor. In some embodiments, the plasma reactor is a transient plasma reactor.

In some embodiments, at least a portion of the flow reactor can be heated, cooled, or both. In some embodiments, at least a portion of the plasma reactor can be heated, cooled, or both. In some embodiments, at least a portion of the system for plasma-based remediation can be heated, cooled, or both.

Some embodiments of the present invention can be defined as any of the following numbered paragraphs:
1. A system for plasma-based remediation, comprising: a flow reactor, wherein the flow reactor comprises an internal chamber and an electrode at least partially disposed within the internal chamber, the internal chamber being configured to be fluidly coupled to a gas source such that a gas from the gas source flows into the internal chamber of the flow reactor, wherein the gas comprises a concentration of a first chemical compound, wherein the first chemical compound is selected from the group consisting of NOx, SOx, and combinations thereof; a pulse generator electrically coupled to the electrode of the flow reactor, the pulse generator being configured to deliver electrical pulses to the electrode to thereby form a plasma from the gas, the first chemical compound being converted to a second chemical compound in the plasma; and a water source fluidly coupled to the internal chamber of the flow reactor, the water source being configured to inject water into the internal chamber of the flow reactor to form ˙OH (hydroxyl radical) molecules from at least a first portion of the injected water when the electrical pulses are delivered to the electrode, the ˙OH molecules reacting with the second chemical compound in the plasma so as to convert the second chemical compound into a water soluble chemical compound, and at least a second portion of the injected water removing the water soluble chemical compound from the flow reactor, thereby reducing the concentration of the first chemical compound in the gas.
2. The system of paragraph 1, wherein the electrode is selected from the group consisting of a three-wire electrode, a four-wire electrode, and an extruded electrode.
3. The system of paragraph 2, wherein the extruded electrode includes a central portion and at least one arm extending from the central portion.
4. The system of paragraph 1, wherein the plasma is a non-thermal plasma.
5. The system of paragraph 1, wherein NOx is NO.
6. The system of paragraph 5, wherein the second chemical compound is $NO_2$.
7. The system of paragraph 6, wherein the water soluble chemical compound is $HNO_3$.
8. The system of paragraph 1, wherein SOx is $SO_2$.
9. The system of paragraph 8, wherein the second chemical compound is $HSO_3$.
10. The system of paragraph 9, wherein the water soluble chemical compound is $H_2SO_4$.
11. The system of paragraph 1, wherein the pulse generator is a solid-state nanosecond high voltage pulse generator.
12. The system of paragraph 1, wherein the gas is an exhaust gas.
13. The system of paragraph 1, wherein the gas source is an engine.
14. The system of paragraph 13, wherein the engine is a combustion engine.
15. The system of paragraph 13, wherein the engine is a diesel engine.
16. The system of paragraph 1, wherein the electrical pulses are high voltage nanosecond electrical pulses.
17. The system of paragraph 1, wherein the electrical pulses have a repetition rate of up to 2000 Hz.
18. The system of paragraph 1, wherein the water is water aerosol.
19. The system of paragraph 1, wherein the water is water vapor.
20. The system of paragraph 1, wherein at least a portion of the flow reactor can be heated, cooled, or both.
21. A method for plasma-based remediation, comprising: receiving a gas from a gas source into an internal chamber of a flow reactor, wherein the gas comprises a concentration of a first chemical compound, wherein the first chemical compound is selected from the group consisting of NOx, SOx, and combinations thereof; delivering electric pulses to an electrode positioned in the internal chamber such that a plasma is formed from the gas, wherein the first chemical compound is converted to a second chemical compound in the plasma; injecting water into the internal chamber of the flow reactor in the presence of the plasma, wherein ˙OH (hydroxyl radical) molecules are formed from at least a first portion of the injected water when the electrical pulses are delivered to the electrode, and wherein the ˙OH molecules react with the second chemical compound so as to convert the second chemical compound into a water soluble chemical compound; and removing at least a second portion of the injected water from the flow reactor, wherein the second portion of the injected water comprises the water soluble compound, thereby reducing the concentration of the first chemical compound in the gas.

22. The method of paragraph 21, wherein the electrode is selected from the group consisting of a three-wire electrode, a four-wire electrode, and an extruded electrode.

23. The method of paragraph 22, wherein the extruded electrode includes a central portion and at least one arm extending from the central portion.

24. The method of paragraph 21, wherein the plasma is a non-thermal plasma.

25. The method of paragraph 21, wherein NOx is NO.

26. The method of paragraph 25, wherein the second chemical compound is $NO_2$.

27. The method of paragraph 26, wherein the water soluble chemical compound is $HNO_3$.

28. The method of paragraph 21, wherein SOx is $SO_2$.

29. The method of paragraph 28, wherein the second chemical compound is $HSO_3$.

30. The method of paragraph 29, wherein the water soluble chemical compound is $H_2SO_4$.

31. The method of paragraph 21, wherein the electric pulses are delivered by a pulse generator.

32. The method of paragraph 31, wherein the pulse generator is a solid-state nanosecond high voltage pulse generator.

33. The method of paragraph 21, wherein the gas is an exhaust gas.

34. The method of paragraph 21, wherein the gas source is an engine.

35. The method of paragraph 34, wherein the engine is a combustion engine.

36. The method of paragraph 34, wherein the engine is a diesel engine.

37. The method of paragraph 21, wherein the electrical pulses are high voltage nanosecond electrical pulses.

38. The method of paragraph 21, wherein the electrical pulses have a repetition rate of up to 2000 Hz.

39. The method of paragraph 21, wherein the water is water aerosol.

40. The method of paragraph 21, wherein the water is water vapor.

41. The method of paragraph 21, wherein at least a portion of the flow reactor can be heated, cooled, or both.

42. A plasma reactor for plasma-based remediation, comprising: a flow reactor comprising an internal chamber; a gas input port coupled to the flow reactor, the gas input port being configured to fluidly couple a gas source to the flow reactor such that a gas can flow into the internal chamber of the flow reactor; an electrode at least partially disposed within the internal chamber of the flow reactor; a pulse generator electrically coupled to the electrode, the pulse generator being configured to deliver electrical pulses to the electrode to thereby form a plasma from the gas; a water inlet port coupled to the flow reactor, the water inlet port being configured to fluidly couple a water source to the internal chamber of the flow reactor, the water source being configured to inject water into the internal chamber of the flow reactor in the presence of the plasma; a gas outlet port coupled to the flow reactor, the gas outlet port being configured to remove the gas from the internal chamber of the flow reactor; and a water output port coupled to the flow reactor, the water output port being configured to remove the water from the internal chamber of the flow reactor.

43. The plasma reactor of paragraph 42, wherein the electrode is selected from the group consisting of a three-wire electrode, a four-wire electrode, and an extruded electrode.

44. The plasma reactor of paragraph 43, wherein the extruded electrode includes a central portion and at least one arm extending from the central portion.

45. The plasma reactor of paragraph 42, wherein the plasma is a non-thermal plasma.

46. The plasma reactor of paragraph 42, wherein the pulse generator is a solid-state nanosecond high voltage pulse generator.

47. The plasma reactor of paragraph 42, wherein the gas is an exhaust gas.

48. The plasma reactor of paragraph 42, wherein the gas source is an engine.

49. The plasma reactor of paragraph 48, wherein the engine is a combustion engine.

50. The plasma reactor of paragraph 48, wherein the engine is a diesel engine.

51. The plasma reactor of paragraph 42, wherein the electrical pulses are high voltage nanosecond electrical pulses.

52. The plasma reactor of paragraph 42, wherein the electrical pulses have a repetition rate of up to 2000 Hz.

53. The plasma reactor of paragraph 42, wherein the water is water aerosol.

54. The plasma reactor of paragraph 42, wherein the water is water vapor.

55. The plasma reactor of paragraph 42, wherein at least a portion of the flow reactor can be heated, cooled, or both.

To provide aspects of the present disclosure, embodiments may employ any number of programmable processing devices that execute software or stored instructions. Physical processors and/or machines employed by embodiments of the present disclosure for any processing or evaluation may include one or more networked (Internet, cloud, WAN, LAN, satellite, wired or wireless (RF, cellular, WiFi, Bluetooth, etc.)) or non-networked general purpose computer systems, microprocessors, filed programmable gate arrays (FPGAs), digital signal processors (DSPs), micro-controllers, smart devices (e.g., smart phones), computer tablets, handheld computers, and the like, programmed according to the teachings of the exemplary embodiments. In addition, the devices and subsystems of the exemplary embodiments can be implemented by the preparation of application-specific integrated circuits (ASICs) or by interconnecting an appropriate network of conventional component circuits. Thus, the exemplary embodiments are not limited to any specific combination of hardware circuitry and/or software.

Stored on any one or on a combination of computer readable media, the exemplary embodiments of the present disclosure may include software for controlling the devices and subsystems of the exemplary embodiments, for driving the devices and subsystems of the exemplary embodiments, for enabling the devices and subsystems of the exemplary embodiments to interact with a human user, and the like. Such software can include, but is not limited to, device drivers, firmware, operating systems, development tools, applications software, database management software, and the like. Computer code devices of the exemplary embodiments can include any suitable interpretable or executable code mechanism, including but not limited to scripts, interpretable programs, dynamic link libraries (DLLs), Java classes and applets, complete executable programs, and the like. Moreover, processing capabilities may be distributed across multiple processors for better performance, reliability, cost, or other benefits.

Common forms of computer-readable media may include, for example, a floppy disk, a flexible disk, a hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read. Such storage media can also be employed to store other types of data, e.g., data organized in a database, for access, processing, and communication by the processing devices.

The various methods and techniques described above provide a number of ways to carry out the application. Of course, it is to be understood that not necessarily all objectives or advantages described can be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. A variety of alternatives are mentioned herein. It is to be understood that some preferred embodiments specifically include one, another, or several features, while others specifically exclude one, another, or several features, while still others mitigate a particular feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be employed in various combinations by one of ordinary skill in this art to perform methods in accordance with the principles described herein. Among the various elements, features, and steps some will be specifically included and others specifically excluded in diverse embodiments.

Although the application has been disclosed in the context of certain embodiments and examples, it will be understood by those skilled in the art that the embodiments of the application extend beyond the specifically disclosed embodiments to other alternative embodiments and/or uses and modifications and equivalents thereof.

Examples

The invention is further illustrated by the following examples which are intended to be purely exemplary of the invention, and which should not be construed as limiting the invention in any way. The following examples are illustrative only, and are not intended to limit, in any manner, any of the aspects described herein. The following examples are provided to better illustrate the claimed invention and are not to be interpreted as limiting the scope of the invention. To the extent that specific materials are mentioned, it is merely for purposes of illustration and is not intended to limit the invention. One skilled in the art may develop equivalent means or reactants without the exercise of inventive capacity and without departing from the scope of the invention.

Example 1

Preliminary Results: Using the simple experimental setup shown in FIG. 2A, we have demonstrated a 7-fold improvement in $SO_2$ capture (from 6.6% to 44%). Here, a synthetic gas mixture containing 225 PPM of $SO_2$ is bubbled through 100 ml $H_2O$, while the residual gas is analyzed using a Horiba portable gas analyzer (FIG. 2B). Without the plasma, we observe a reduction in the $SO_2$ concentration to 210 PPM due to the capture in water (FIG. 2B). This represents a 6.6% reduction in $SO_2$. When the same $SO_2$ synthetic gas mixture is first passed through a transient plasma reactor (2" diameter) and then bubbled through 100 ml $H_2O$, the $SO_2$ content of the residual gas drops to 125 PPM, which corresponds to a 44% reduction in the $SO_2$ (FIG. 2B). Based on these values, we are able to achieve a 7-fold improvement in $SO_2$ capture (from 6.6% to 44%), demonstrating the effectiveness of the transient plasma to improve or enhance the SOx removal efficiency. The main mechanism here is that the plasma converts $SO_2$ to $H_2SO_4$, which has a solubility that is orders of magnitude higher than $SO_2$. This transient plasma-based approach enables SOx scrubbers to be designed with improved efficiencies using small volumes of water.

Our preliminary experiments have indicated that when an exhaust gas containing sulfur dioxide is subjected to a non-thermal plasma discharge, an amount of sulfuric acid (proportional to the energy density of the discharge) is formed. This sulfuric acid, when dissolved in a given volume of water, increases its ability to retain more sulfur dioxide than without the sulfuric acid, i.e. the solubility of sulfur dioxide in acidic water is higher than in neutral water. Furthermore, numerical simulations have shown that the bottleneck chemical reaction in the conversion of sulfur dioxide to sulfuric acid is $SO_3+H_2O \rightarrow H_2SO_4$. Therefore, increasing the concentration of water downstream of the discharge will increase the rate of this reaction and lead to higher remediation. These two benefits can be realized in an apparatus in which the exhaust gas is pumped from the bottom of a vertical manifold in which water is sprayed from the top and the plasma is discharged close to the water side. The acidified water captures sulfur dioxide that is flowing upward after which it gets drained at the bottom. In the presence of water, the transient plasma produces ˙OH radicals, which drive the rate limiting step from $SO_2 \rightarrow HSO_3$, and the subsequent conversion to $H_2SO_4$. This step is particularly important because of the strong reverse reaction from $SO_3 \rightarrow SO_2$.

Preferred embodiments of this application are described herein, including the best mode known to the inventors for carrying out the application. Variations on those preferred embodiments will become apparent to those of ordinary skill in the art upon reading the foregoing description. It is contemplated that skilled artisans can employ such variations as appropriate, and the application can be practiced otherwise than specifically described herein. Accordingly, many embodiments of this application include all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

All patents, patent applications, publications of patent applications, and other material, such as articles, books, specifications, publications, documents, things, and/or the like, referenced herein are hereby incorporated herein by this reference in their entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

It is to be understood that the embodiments of the application disclosed herein are illustrative of the principles of the embodiments of the application. Other modifications that can be employed can be within the scope of the application. Thus, by way of example, but not of limitation, alternative configurations of the embodiments of the application can be utilized in accordance with the teachings herein. Accordingly, embodiments of the present application are not limited to that precisely as shown and described.

Various embodiments of the invention are described above in the Detailed Description. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventors that the words and phrases in the specification and claims be given the ordinary and accustomed meanings to those of ordinary skill in the applicable art(s).

The foregoing description of various embodiments of the invention known to the applicant at this time of filing the application has been presented and is intended for the purposes of illustration and description. The present description is not intended to be exhaustive nor limit the invention to the precise form disclosed and many modifications and variations are possible in the light of the above teachings. The embodiments described serve to explain the principles of the invention and its practical application and to enable others skilled in the art to utilize the invention in various embodiments and with various modifications as are suited to the particular use contemplated. Therefore, it is intended that the invention not be limited to the particular embodiments disclosed for carrying out the invention.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

What is claimed is:

1. A sulfur gas remediation apparatus, comprising:

a vertical manifold having an exhaust gas inlet at a lower end;

an axially disposed, plasma inducing elongate electrode;

an electrical pulse source coupled to the axially disposed, plasma inducing elongate electrode and configured to deliver repeated electrical pulses to the electrode;

a flow reactor chamber above the exhaust gas inlet;

a fluid source; and an aerosolizing nozzle fluidly connected to the fluid source, said aerosolizing nozzle disposed within the flow reactor chamber downstream of and directed toward the exhaust gas inlet, and above the plasma inducing elongate electrode;

wherein the electrical pulse source creates a transient plasma having a frequency of at least eight hundred hertz (800 Hz).

2. The sulfur gas remediation apparatus of claim 1, wherein the electrical pulse source delivers a transient power of 4.76 Megawatts at peak voltage.

3. The sulfur gas remediation apparatus of claim 1, wherein the electrical pulse source is configured to excite electrons in the flow reactor to a temperature of 30 eV.

4. The sulfur gas remediation apparatus of claim 1, wherein the transient plasma has a frequency of two thousand Hertz (2000 Hz).

* * * * *